United States Patent
Yao et al.

(10) Patent No.: US 12,495,435 B2
(45) Date of Patent: Dec. 9, 2025

(54) INTER-UE COMMUNICATION COORDINATION AND COLLISION RESPONSE

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haitong Sun, Cupertino, CA (US); Oghenekome Oteri, San Diego, CA (US); Seyed Ali Akbar Fakoorian, San Diego, CA (US); Sudhir K. Baghel, Fremont, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 17/770,330

(22) PCT Filed: May 8, 2021

(86) PCT No.: PCT/CN2021/092390
§ 371 (c)(1),
(2) Date: Nov. 17, 2022

(87) PCT Pub. No.: WO2022/236475
PCT Pub. Date: Nov. 17, 2022

(65) Prior Publication Data
US 2024/0147514 A1    May 2, 2024

(51) Int. Cl.
*H04W 72/542* (2023.01)
*H04W 72/56* (2023.01)
*H04W 74/0808* (2024.01)

(52) U.S. Cl.
CPC ......... *H04W 72/542* (2023.01); *H04W 72/56* (2023.01); *H04W 74/0825* (2013.01)

(58) Field of Classification Search
CPC ............................ H04W 72/542; H04W 72/56; H04W 74/0825
See application file for complete search history.

(56) References Cited

U.S. PATENT DOCUMENTS

| | | | |
|---|---|---|---|
| 12,004,121 B2 * | 6/2024 | Ganesan | H04W 72/02 |
| 2018/0049220 A1 * | 2/2018 | Patil | H04L 5/0062 |

(Continued)

FOREIGN PATENT DOCUMENTS

| | | |
|---|---|---|
| CN | 111082900 A | 4/2020 |
| CN | 111092673 A | 5/2020 |

(Continued)

OTHER PUBLICATIONS

Notice of International Preliminary Report on Patentability dated Nov. 13, 2023 in connection with Application Serial No. PCT/CN2021/092390.

(Continued)

*Primary Examiner* — Won Tae C Kim
(74) *Attorney, Agent, or Firm* — Eschweiler & Potashnik, LLC; Matthew Glause

(57) ABSTRACT

Techniques described herein may include new and enhanced solutions for several aspects of inter-UE communications. For example, techniques described herein may provide inter-UE coordination techniques for different types of resource sets, sensing operations for inter-UE communication, and how UEs involved in inter-UE communication may be determined. In additional, or alternative, examples, techniques described herein may provide solutions for post-collision schemes, including how certain resource sets may be applied, whether and how to jointly transmit post-collision and pre-collision indications, and how to determine the resources for post-collision indication.

23 Claims, 13 Drawing Sheets

(56) References Cited

U.S. PATENT DOCUMENTS

| | | | |
|---|---|---|---|
| 2022/0232427 A1* | 7/2022 | Nguyen | H04L 5/0007 |
| 2022/0386243 A1* | 12/2022 | Liang | H04W 72/569 |
| 2023/0362739 A1* | 11/2023 | Zhao | H04W 72/25 |
| 2024/0106575 A1* | 3/2024 | Salim | H04L 1/1854 |
| 2024/0155654 A1* | 5/2024 | Panteleev | H04L 5/0037 |

FOREIGN PATENT DOCUMENTS

| | | |
|---|---|---|
| CN | 111615184 A | 9/2020 |
| WO | 2020243971 A1 | 12/2020 |

OTHER PUBLICATIONS

3rd Generation Partnership Project; Technical Specification Group Radio Access Network; Study on evaluation methodology of new Vehicle-to-Everything (V2X) use cases for LTE and NR; (Release 15); 3GPP TR 37.885 V15.3.0 (Jun. 2019); http://www.3gpp.org.

3rd Generation Partnership Project; Technical Specification Group Radio Access Network; NR; Radio Resource Control (RRC) protocol specification; (Release 16); 3GPP TS 38.331 V16.4.1 (Mar. 2021); http://www.3gpp.org.

3rd Generation Partnership Project; Technical Specification Group Radio Access Network; NR; Physical layer procedures for data; (Release 16); 3GPP TS 38.214 V16.5.0 (Mar. 2021); http://www.3gpp.org.

3rd Generation Partnership Project; Technical Specification Group Radio Access Network; NR; Multiplexing and channel coding; (Release 16); 3GPP TS 38.212 V16.5.0 (Mar. 2021); http://www.3gpp.org.

PCT Search Report dated Jan. 27, 2022 in connection with PCT Application No. PCT/CN2021/092390.

PCT Written Opinion dated Jan. 30, 2022 in connection with PCT Application No. PCT/CN2021/092390.

Qualcomm Incorporated Reliability and Latency Enhancements for Mode 2 "3GPP TSG RAN WG1 Meeting #104-e; R1-2101910" Feb. 5, 2021.

Apple Inter-UE Coordination for Mode 2 Resource Allocation "3GPP TSG RAN WG1 #104-e R1-2101358" Feb. 5, 2021.

Spreadtrum Communications; "Discussion on inter-UE coordination in sidelink resource allocation"; 3GPP TSG RAN WG1 #104b-e ; R1-2102468; Apr. 12, 2021.

European Extended Search Report dated in Mar. 18, 2025 in Connection with Application No. 21941056.0.

* cited by examiner

INTER-UE COMMUNICATION COORDINATION AND COLLISION RESPONSE

This application is a National Phase entry application of International Patent Application No. PCT/CN2021/092390, filed on May 8, 2021, entitled "INTER-UE COMMUNICATION COORDINATION AND COLLISION RESPONSE", the contents of which are herein incorporated by reference in their entirety.

FIELD

This disclosure relates to wireless communication networks including techniques for random access procedures of a wireless communication network.

BACKGROUND

As the number of mobile devices within wireless networks, and the demand for mobile data traffic, continue to increase, changes are made to system requirements and architectures to better address current and anticipated demands. For example, some wireless communication networks may be developed to implement fifth generation (5G) or new radio (NR) technology, sixth generation (6G) technology, and so on. An aspect of such technology includes addressing how wireless devices (e.g., user equipment (UE) and base stations) communicate with one another, including UE-to-UE (or inter-UE) communications as well.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Mobile communication networks may include user equipment (UEs) capable of communicating with one another. This may sometimes be referred to as inter-UE communication, side-link communication, and so on. In some scenarios, a transmitting UE may select sidelink transmission resources based solely on its own sensing and resource selection procedure. In other scenarios, UEs may implement inter-UE coordination, where a first UE may determine, based on a sensing procedure, a set of sidelink resources suitable for inter-UE communication and notify a second UE about the sidelink resources. The second UE may consider the determined resources from the first UE upon selecting sidelink resources for its own transmission. In some scenarios, the first UE may also, or alternatively, notify the second UE about sidelink resources that the first UE would not prefer the second UE use for transmission, which may be based on a sensing result and/or potential conflict anticipated by the first UE.

However, current techniques include certain limitations. For example, currently available techniques fail to detail sensing operations that may be used by first UE, identify types of resources set information that would be beneficial or feasible to types of casts (or transmissions). Inter-UE coordination techniques also fail to adequately provide solutions for how the first UE and the second UE may discover, or otherwise determine, that they are involved in an inter-UE communication scenario and specify differences between signaling for support or coordination between UEs and cast (or transmission) types.

Techniques, described herein, may include new and enhanced solutions for several aspects of inter-UE communications. For example, techniques, described herein, may include solutions for inter-UE coordination, such as different types of resource sets, resource allocation procedures, and procedures for determining UEs for inter-UE coordination. Additional techniques, described herein, may include solutions for post-collision schemes, such as restrictions for resource set types for inter-UE coordination, procedures for encoding or applying certain resource sets, procedures for jointly transmitting post-collision and pre-collision indications, and procedures for determining resources for post-collision indication. Examples, implementations, features, and details of these techniques and solutions are described below with reference to the Figures.

Figure 1:
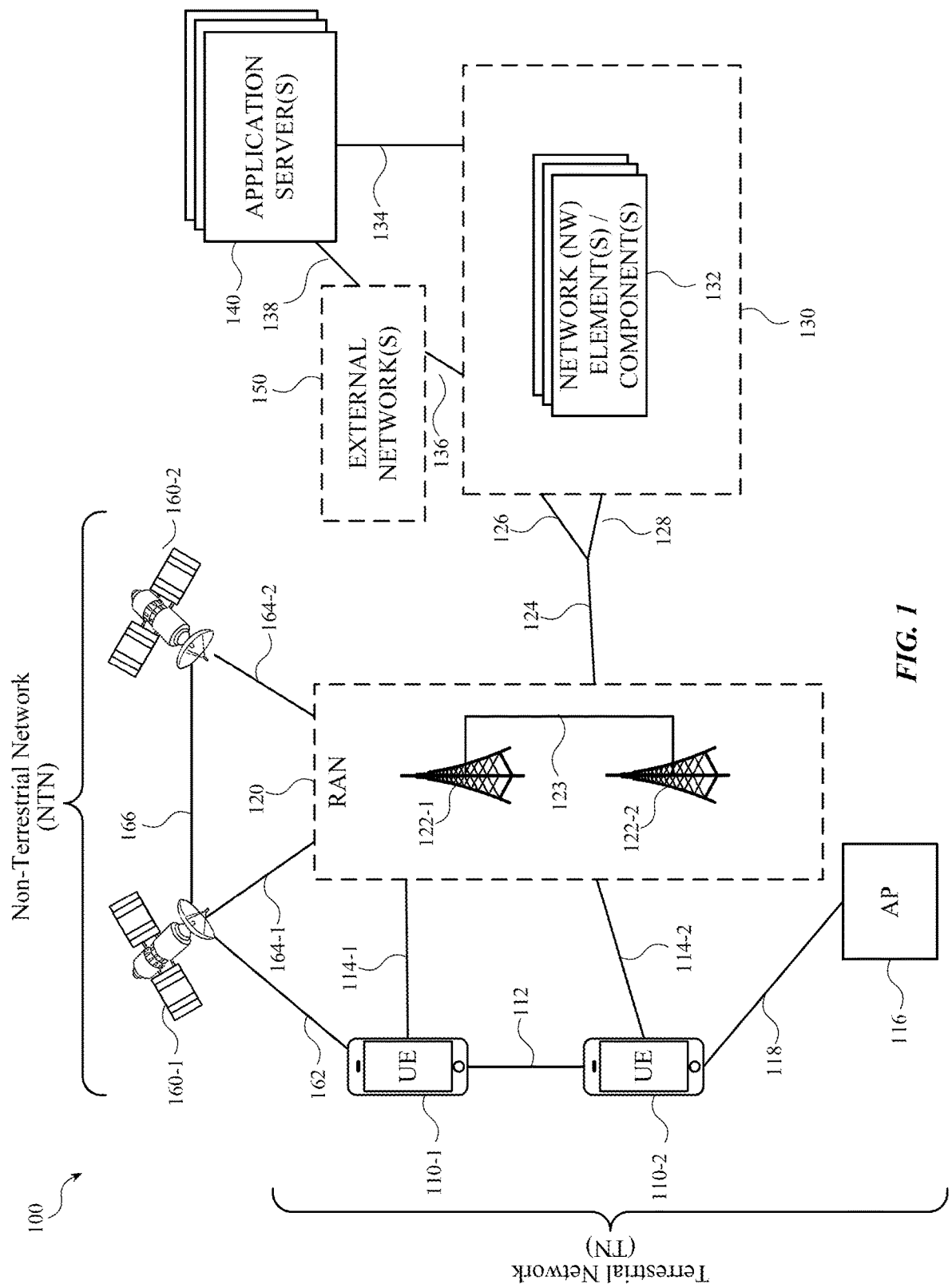
FIG. 1 is a diagram of an example network according to one or more implementations described herein.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WOMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 110, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 122.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (Rees); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130 via interfaces 124, 126, and 128. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs)) offering applications that use IP bearer resources with CM 130 (e.g., universal mobile telecommunications system packet services (UMTS PS) domain, LTE PS data services, etc.). Application servers 140 may also, or alternatively, be configured to support one or more communication services (e.g., voice over IP (VoIP) sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
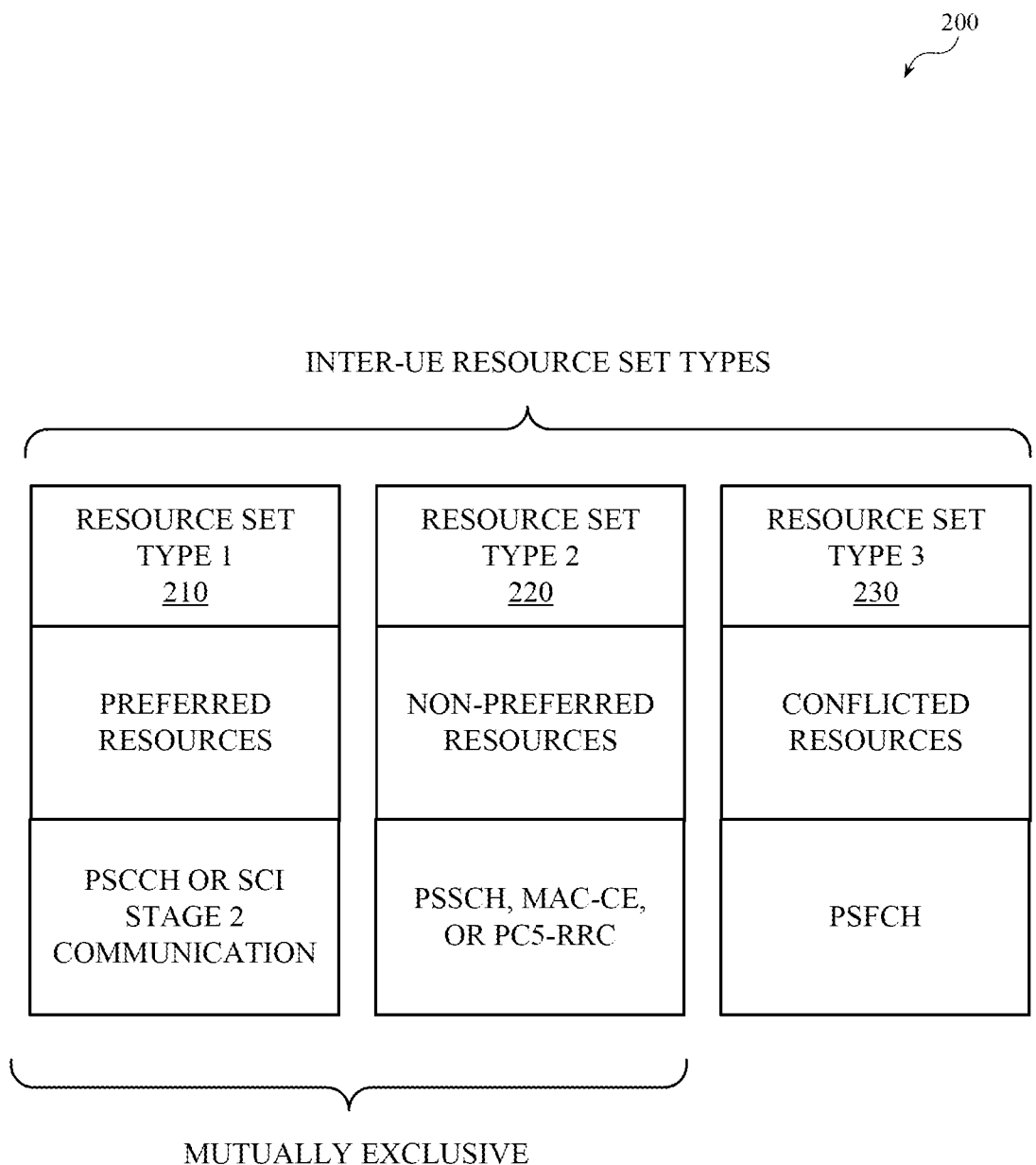
FIG. 2 is a diagram of an example of types of inter-user equipment (UE) resource sets.

FIG. 2 is a diagram of an example 200 of types of inter-UE resource sets 210-230. As shown, a first type (e.g., Type 1, Type A, etc.) of resource set 210 may include resources that a UE may prefer to be used in inter-UE communications. For example, a first UE 110 may send to a second UE 110 an indication of the set of resources that the first UE 110 prefers or recommends the second UE 110 use for inter-UE communications. By contrast, a second type (e.g., Type 2, Type B, etc.) of resource set 220 may include resources that a UE 110 may prefer not to be used in inter-UE communications. For example, a first UE 110 may send to a second UE 110 an indication of the set of resources that the first UE 110 prefers or recommends the second UE not use for inter-UE communications.

A third type (e.g., Type 3, Type C, etc.) of resource set 230 may include resources that are in conflict in an inter-UE communication environment (e.g., resources being used by multiple UEs). For example, a first UE 110 and a second UE 110 may be using the same, or similar resources for inter-UE communications, such that signaling and communication between the UEs 110 conflict or interrupt each other. The first type and the second type of resource sets may be mutually exclusive of one another, while the first type of resource set may not be mutually exclusive of either the first or second type of resource sets.

A type of resource set, as described herein, may include information describing wireless resources (e.g., UL and/or DL channels, carriers, timing information, etc.) that UE 110 may use for inter-UE (or UE-to-UE) communication. The process for determining the resources that may be used by UE 110 for inter-UE communication may include one or more processes or communications. For example, continuing with the examples described above with a first UE 110 and a second UE 110, the second UE 110 may determine which type of resources to use for inter-UE communication based on one or more factors.

Examples of such factors may include quality of service (QoS) data (e.g., a Type 1 resource set for data with high priority and a Type 2 resource set for data with low priority); a packet delay budget (e.g., a Type 1 resource set for packets with a small packet delay budget and a Type 2 resource set for packets with large packet delay budget); a cast-type of transmissions of the second UE 110 (e.g., Type 1 resource set for groupcast or broadcast; Type 2 resource set for unicast or groupcast); a type of resources the first UE 110 may send to the second UE 110; etc. Additionally, or alternatively, the type of resources that the first UE 110 may determine to send to the second UE 110 may depend on one or more factors and/or determinations made by the first UE 110, such as sensing results measured or determined by the first UE 110 (e.g., use Type 1 resource set if large amount of resources are unavailable); a congestion level (e.g., if the congestion level is above a threshold, then a Type 1 resource set may be used; otherwise a Type 2 resource set may be used); a distance (e.g., use Type 2 resource set if the distance is large; otherwise Type 1 resource set may be used); payload size (e.g., use Type 1 resource set if payload size is large; otherwise Type 2 resource set may be used).

Signaling a type of resource set may involve a particular or pre-designated signaling configuration, which may include, or be based on, one or more of a capacity of UE 110 to send or receive such signaling, a resource pool configuration (e.g., a designated pool of resources for such signaling) PC5-RRC connection or configuration (e.g., for a unicast message), etc. Additionally, or alternatively, signaling the type of resource set may involving a dynamic indication, such as an indication in a message (e.g., a sidelink inter-UE coordination request) from the second UE to the first UE, an indication in a message (e.g., a sidelink inter-UE coordination message) from the first UE to the second UE, etc. Such indications may include a bit field in sidelink control information (SCI) exchanged between UEs 110. For example, a "0" may indicate a preferred set of resources (e.g., Type 1) and a "1" may indicate a non-preferred set of resources (or vice versa).

Additionally, a container or arrangement of information for a resource set may depend on one or more factors, such as the type of resource set. For example, Type 1 resource sets may have smaller payload sizes, since they may contain relatively fewer preferred resources, and may be contained in a physical sidelink control channel (PSCCH) and/or SCI stage 2 message. As another example, Type 2 of resource sets may have larger payload sizes, since they may include all, or many, non-preferred resources. Additionally, or alternatively, a physical sidelink shared channel (PSSCH) may contain Type 2 resources sets in a PC5-RRC message and/or media access control (MAC) control element (MAC-CE). Additionally, or alternatively, Type 3 resources set may include a single bit and/or may be transmitted in a physical sidelink feedback channel (PSFCH).

Figure 3:
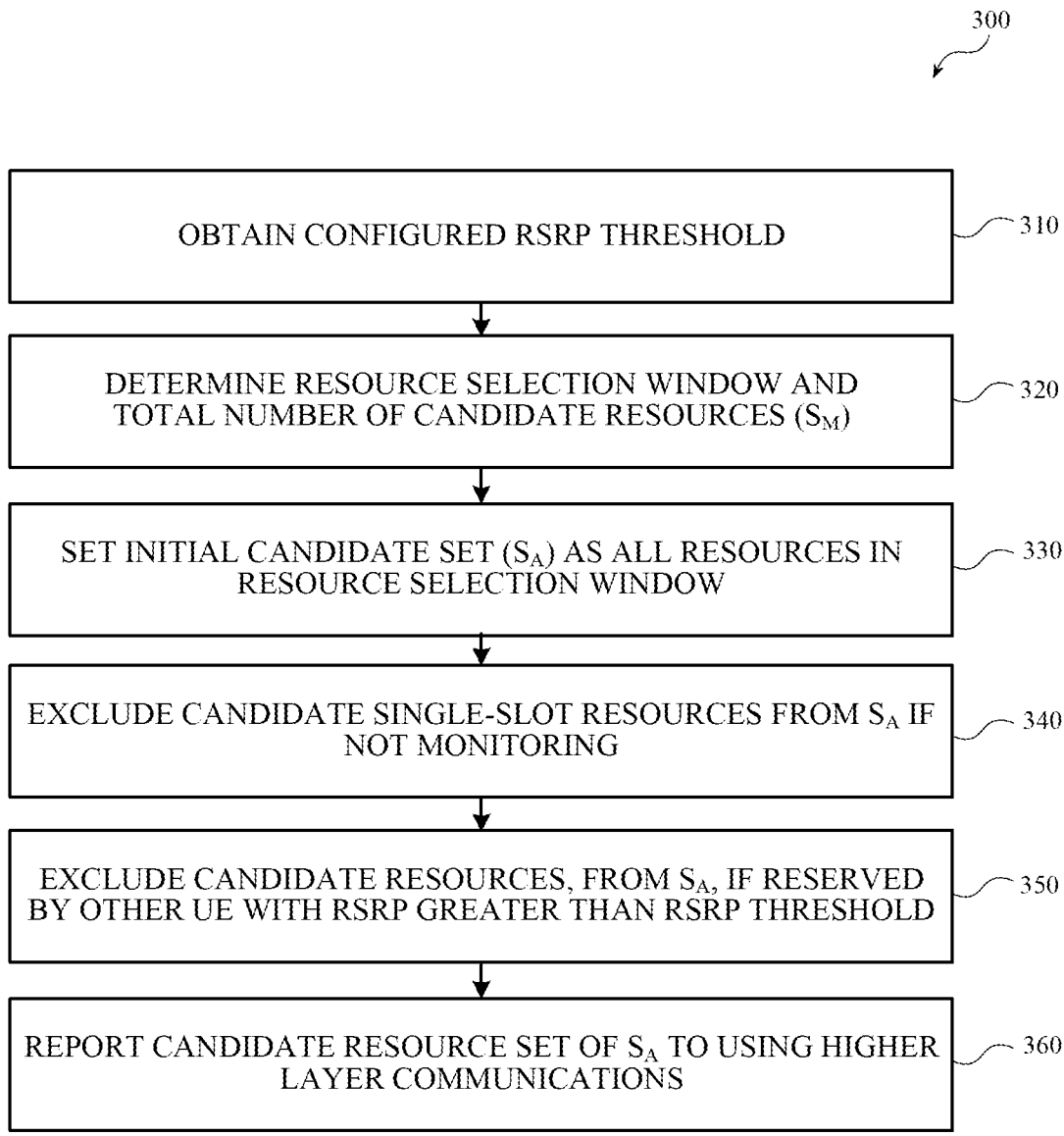
FIG. 3 is a diagram of an example of a process for identifying a set of candidate resources for inter-UE communication.

FIG. 3 is a diagram of an example of a process 300 for identifying a set of candidate resources for inter-UE communication. Process 300 may be implemented by UE 110. In some implementations, some or all of process 300 may be performed by one or more other systems or devices, including one or more of the devices of FIG. 1. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3. Additionally, while process 300 may be primarily described from the perspective a particular device (e.g., UE 110), the techniques described herein also include corresponding operations performed by a corresponding device (e.g., another UE 110).

As shown, process 300 may include obtaining a configured reference signal received power (RSRP) threshold (block 310). For example, UE 110 may determine, or otherwise obtain, a RSRP threshold that is configured or designated for inter-UE communications. In some implementations, UE 110 may receive the RSRP threshold from another UE 110 and/or base station 122 and may store the RSRP threshold in a memory device of UE 110. In some implementations, UE 110 may determine the RSRP threshold based on information from another UE 110, such as a distance between UE 110 and the other UE 110. For example, the shorter the distance between the UEs 110, the lower the RSRP threshold may be.

Process 300 may include determining a resource selection window and a total number of candidate resources ($S_M$) (block 320). For example, UE 110 may determine a communication window during which resources may be selected and a total number of resources corresponding to the resource selection windows. The total number of candidate resources may be based on a configuration, or allocation, of channels, spacing, timing, etc., allocated for inter-UE communications. In some implementations, UE 110 may determine the resource selection window and/or a total number of candidate resources based on information that UE 110 receives from the other UE 110, information received from base station 122, and/or information stored locally by UE 110.

Process 300 may include setting an initial candidate set ($S_A$) as all candidate resources in the resource selection window (block 330). For example, UE 110 may determine an initial candidate set (e.g., for identifying a set of candidate resources for inter-UE communication) as all the resources corresponding to the resource selection window. Additionally, or alternatively, process 300 may include excluding single-slot candidate resources, from the candidate resources set ($S_A$), that are not being monitored (block 340). For example, UE 110 may determine single-slot resources, of the initial candidate set that are not being monitored (e.g., by UE 110) and may remove such candidate resources from the initial candidate set.

Process 300 may include excluding candidate resources, from the candidate resources set ($S_A$), that are reserved by other UEs 110 with a RSRP greater than the RSRP threshold (block 350). For example, UE 110 may determine whether the initial candidate set includes any resources that are reserved, allocated, or being used by other UEs 110 with an RSRP greater than the RSRP threshold.

Additionally, or alternatively, UE 110 may remove such candidate resources, from the initial candidate set. In some implementations, UE 110 may exclude candidate resources reserved by other UEs 110 with a RSRP greater than the RSRP threshold regardless of a priority level or QoS requested, or associated with, the UE 110 of the RSRP threshold and/or a priority level or QoS associated with the UE 110 reserving the candidate resources. In some implementations, UE 110 may determine which UE 110 (e.g., the UE 110 of the RSRP threshold or the UE 110 reserving the candidate resources) is associated with the greatest priority level or QoS and may exclude candidate resources when the UE 110 reserving the candidate resources is associated with a greater RSRP threshold.

In some implementations, the UE 110 of the RSRP and/or UE 110 of a reserved resource may communicate a Tx data priority to UE 110. In some implementations, UE 110 may exclude candidate resources, from the candidate resources set ($S_A$), based on any combination, analysis, application, or comparison of priority data levels and/or RSRP thresholds between different UEs 110. For example, in some implementations, UE 110 may determine a data priority based RSRP threshold associated with a reserved resource and the UE 110 of the RSRP threshold, and may exclude the reserved resource, from the candidate resources set ($S_A$), when a data priority based RSRP threshold of the reserved resource is greater than the data priority based RSRP threshold of the RSRP threshold.

Process 300 may include reporting the candidate resources set ($S_A$) using higher layer communications (block 360). For example, UE 110 may communicate the candidate resources, of the candidate resources set ($S_A$), to one or more other UEs 110, such as the UE 110 to which the RSRP threshold corresponds. Doing so may enable the UE to which the RSRP threshold corresponds to select a resource (or set of resources) from the candidate resources set ($S_A$) for engaging in inter-UE communications.

In some implementations, a first UE 110 and a second UE 110 may configure the resource reselection value ($C_{resel}$), which may be used to help the first UE identify a set of candidate resources for the second UE 110. A resource selection value ($C_{resel}$), as described herein, may include a number of periods the current resource reservation could last. This value may be used in a resource selection procedure and may be a configured value, a reported value from the second UE 110 to the first UE 110, or a predefined value. In some implementations, the resource selection ($C_{resel}$) value may be applied to all resource selections of the second UE 110. In some implementations, the second UE 110 may report the resource reselection value ($C_{resel}$) to the first UE 110 via an inter-UE coordination triggering message. In some implementations, the resource selection value ($C_{resel}$) may be a pre-defined constant (e.g., 1) used for inter-UE coordination.

In some implementations, a first UE 110 and a second UE 110 may configure the data periodicity or number of sub-channels of each resource, which may be used to help the first UE identify a set of candidate resources for the second UE 110. A data periodicity, as described herein, may indicate the periodicity of the resources to be selected. A number of sub-channels of each resource, as described herein, may indicate the number of frequency resources to be selected. In some implementations, the data periodicity or number of sub-channels of each resource may be applied to all resource selections of the second UE 110. In some implementations, the second UE 110 may report the data periodicity or number of sub-channels of each resource to the first UE 110 via an inter-UE coordination triggering message. In some implementations, the data periodicity or number of sub-channels of each resource may be a pre-defined constant used for inter-UE coordination.

In some implementations, a single round may be applied such that no limitation on the minimum percentage of available resources is imposed on the first UE 110 selecting candidate resources for the second UE 110.

Figure 4:
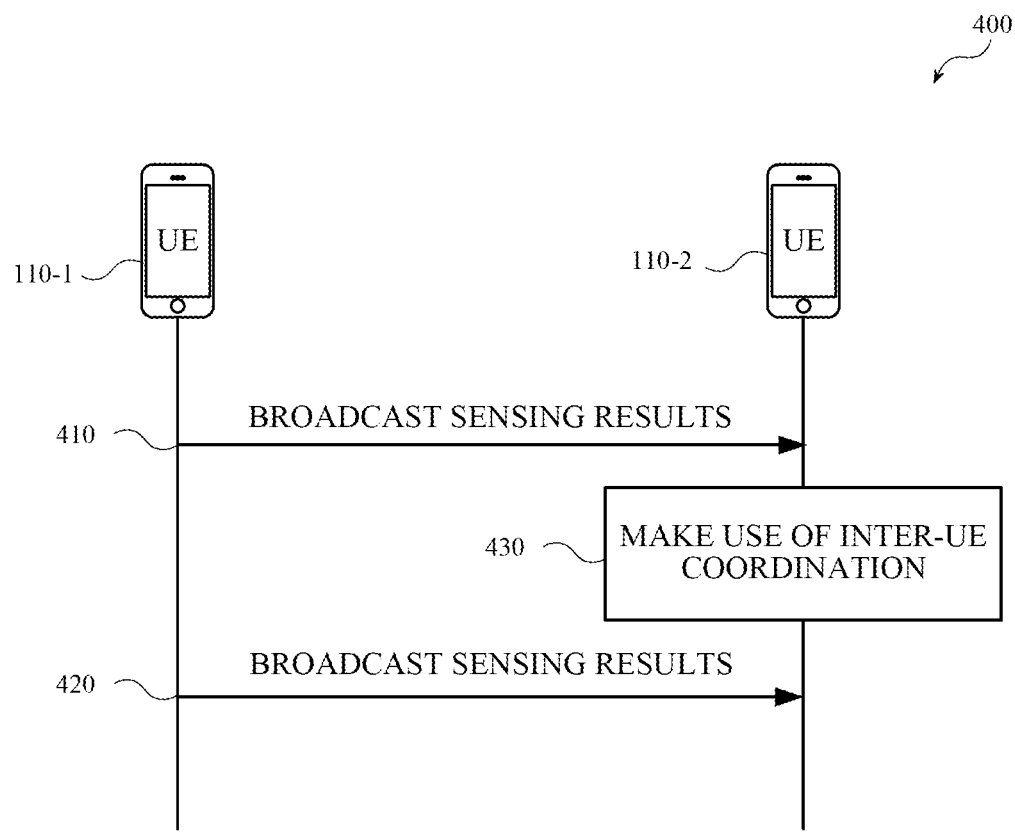
FIG. 4 is a diagram of an example 400 of a process for enabling UEs to discover one another for inter-UE communication.

FIG. 4 is a diagram of an example 400 of a process for enabling UEs 110 to discover one another for inter-UE communication. As shown, example 400 includes UE 110-1 and UE 110-2. In some implementations, some or all of process 400 may be performed by one or more other systems or devices, including one or more of the devices of FIG. 1. Additionally, process 500 may include one or more fewer, additional, differently ordered and/or arranged operations than those shown in FIG. 4. In some implementations, some or all of the operations of process 400 may be performed independently, successively, simultaneously, etc., of one or more of the other operations of process 400. As such, the techniques described herein are not limited to a number, sequence, arrangement, timing, etc., of the operations or process depicted in FIG. 4.

As shown, UE 110-1 may periodically broadcast sensing results to UE 110-2 and other UEs 110 that may be within a broadcast range of UE 110-1 for inter-UE communications (at 410 and 420). The sensing results may include one or more types of information, including information enabling inter-UE communications. Examples of such information may include an indication of wireless devices (e.g., other UEs 110) in the area, wireless resources (e.g., congestion, availability, etc.) in the area, location information of UE 110-1 and/or one or more other UEs 110, etc.

As shown, upon receiving the sensing results, UE 110-2 may use the sensing results for inter-UE communication (at 430). For example, UE 110-2 may determine, based on the sensing results, whether to use the sensing results to engage in inter-UE coordination with UE 110-1 and/or to what degree or level UE 110-2 should engage in inter-UE coordination with UE 110-1. For example, UE 110-2 may use the sensing results and a location of UE 110-2 to determine a distance between UE 110-1 and UE 110-2, and determine whether to engage in inter-UE coordination with UE 110-1 based on the distance between the devices. In some aspects, this may include UE 110-2 applying the determined distance to a distance threshold and/or comparing the measured distance to a measured distance involving another UE 110 in the area.

Figure 5:
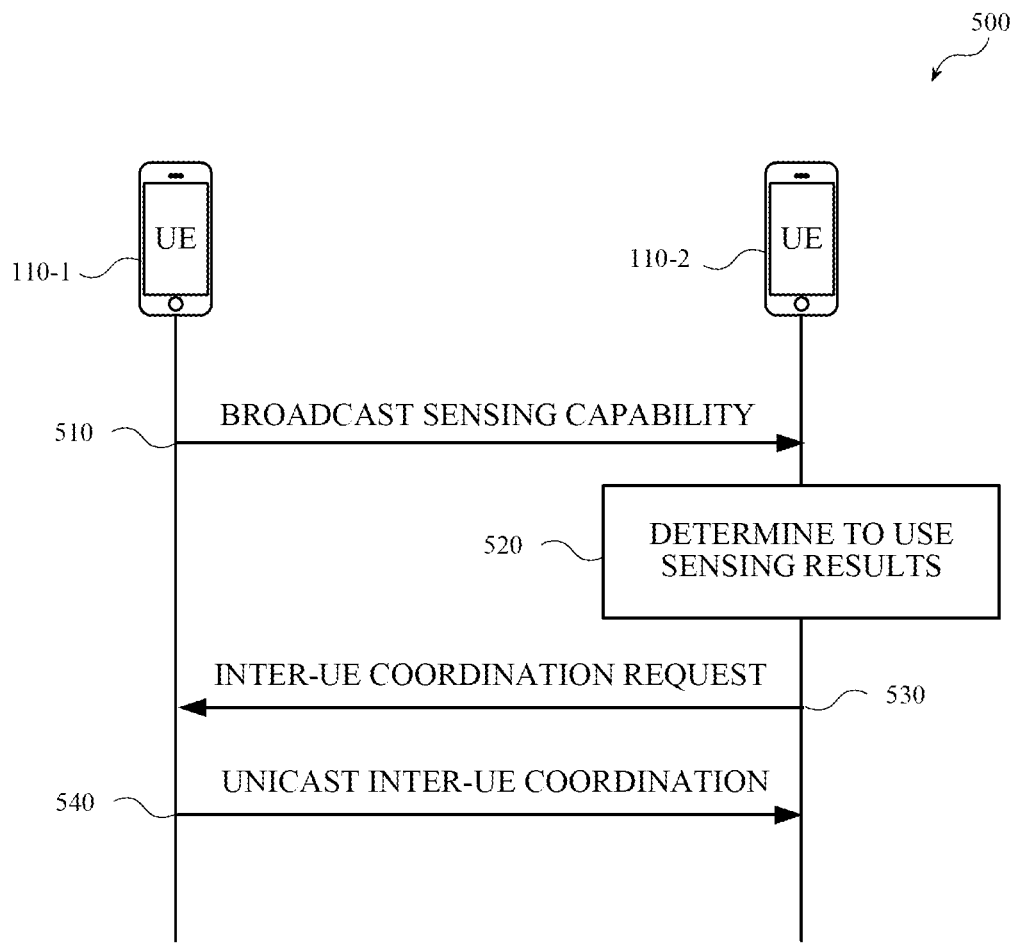
FIG. 5 is a diagram of an example of a process for enabling inter-UE coordination.

FIG. 5 is a diagram of an example 500 of a process for enabling inter-UE coordination. As shown, example 500 includes UE 110-1 and UE 110-2. In some implementations, some or all of process 500 may be performed by one or more other systems or devices, including one or more of the devices of FIG. 1. Additionally, process 500 may include one or more fewer, additional, differently ordered and/or arranged operations than those shown in FIG. 5. In some implementations, some or all of the operations of process 500 may be performed independently, successively, simultaneously, etc., of one or more of the other operations of process 500. As such, the techniques described herein are not limited to a number, sequence, arrangement, timing, etc., of the operations or process depicted in FIG. 5.

As shown, UE 110-1 may broadcast (or groupcast) sensing capability information to UE 110-2 and other UEs 110 that may be within a broadcast range of UE 110-1 for inter-UE communications (at 510). The sensing capability information may include one or more types of information, including information enabling inter-UE communications. Examples of such information may include an indication of a capability of UE 110-1 to engage in inter-UE coordination, a location of UE 110-1, and so on. Upon receiving the sensing capability, UE 110-2 may use the sensing capability information to, for example, determine whether (and/or to what level or degree) engage in inter-UE coordination with UE 110-1. This determination may be based on one or more factors, such as a determined distance between UE 110-1 and UE 110-2, a measured signal strength from UE 110-1, inter-UE signaling received from other UEs 110 in the area, etc. Assume that UE 110-2 determines to engage in inter-UE coordination with UE 110-1 (at 520). UE 110-2 may communicate a request for inter-UE coordination to UE 110-1 (at 530), and in response to the request from UE 110-2, UE 110-1 may unicast an inter-UE coordination message to UE 110-2 (at 540).

Figure 6:
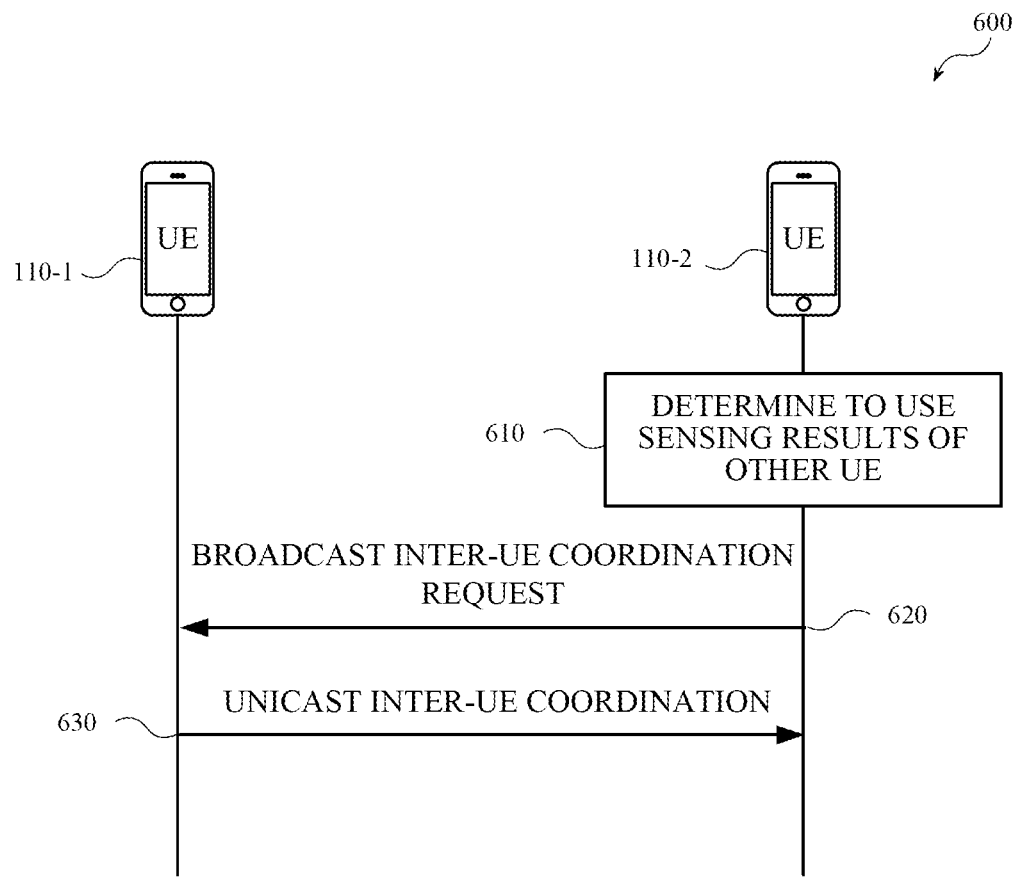
FIG. 6 is a diagram of an example of a process for enabling inter-UE coordination.

FIG. 6 is a diagram of an example 600 of a process for enabling inter-UE coordination. As shown, example 600 includes UE 110-1 and UE 110-2. In some implementations, some or all of process 600 may be performed by one or more other systems or devices, including one or more of the devices of FIG. 1. Additionally, process 600 may include one or more fewer, additional, differently ordered and/or arranged operations than those shown in FIG. 6. In some implementations, some or all of the operations of process 600 may be performed independently, successively, simultaneously, etc., of one or more of the other operations of process 600. As such, the techniques described herein are not limited to a number, sequence, arrangement, timing, etc., of the operations or process depicted in FIG. 6.

Assume that UE 110-2 may receive sensing results from other UEs 110 broadcasting sensing results in the area. UE 110-2 may determine, based on the sensing results, to a broadcast inter-UE coordination request to UEs 110 in the area (at 610 and 620). The request may include a location of UE 110-2, and upon receiving the request, UE 110-1 may determine whether to engage in inter-UE coordination and communication with UE 110-2 based on one or more factors, such as a measured distance between UE 110-1 and UE 110-2 (e.g., whether the distance is less than a distance threshold). If UE 110-1 determines to engage in inter-UE coordination with UE 110-2, UE 110-1 may respond by unicasting an inter-UE coordination message to UE 112-2 (at 630). The message may include a location of UE 110-1 and/or a measured distanced between UE 110-1 and UE 110-2, and UE 110-2 may determine whether to engage in inter-UE communication with UE 110-2 based on a distance between the devices (e.g., whether the distance exceeds a distance threshold). In some implementations, UE 110-2 may also, or alternatively, determine whether to engage in inter-UE coordination with UE 110-2 based on responses (e.g., inter-UE coordination messages) UE 110-2 may have received from other UEs 110 that may have received the inter-UE coordination request broadcasted by earlier by UE 110-2. For example, in such scenarios, UE 110-2 may determine which UE 110 to engage based on a determination of which devices are furthest or closest to UE 110-2.

In some implementations, UEs 110 engaged in inter-UE communication may experience a conflict or collision involving resources used by UEs 110 for inter-UE communication. For example, signals sent by a second UE 110 and a third UE 110 may interrupt one another when some or all of the signals are sent using similar resources (e.g., at the same, or similar, times and/or using the same, or similar frequencies). In such a scenario, a first UE 110 may detect the signal conflict or collision, which may be a trigger for the first UE 110 to initiate inter-UE coordination with the second UE 110 to indicate the conflict. In some implementations, the first UE 110 may identify a conflict between the second UE 110 and the third UE 110 before a collision occurs (e.g., because of the resource sets allocated to the second UE 110 and the third UE 110, and may communicate with the second UE 110 to resolve the conflict before an actual collision occurs (e.g., pre-collision). In some implementations, the first UE 110 may identify a conflict between the second UE 110 and the third UE 110 after a collision occurs (e.g., post collision) and may communicate with the second UE 110 to address the collision by for example each UE 110 retransmitting the signal using different resources (e.g., at different times and frequencies). A pre-collision scenario, as described herein, may be referred to as a Type B (or Type 2) inter-UE coordination scenario, where the first UE 110 notifies the second UE 110 of a set of resources not preferred for the second UE 110 (e.g., based on sensing results and/or expected/potential resource conflicts). A post collision scenario, as described herein, may be referred to as a Type C (or Type 3) inter-UE coordination scenario, where the first UE 110 notifies the second UE 110 of a set of resources where the resource conflict is detected. A Type C resource set, as described herein, may include an indication of a previous signaling collision, and indication of the resources involved in the collision, and/or resources for retransmitting the signal collision.

Techniques, described herein, may include solutions for inter-UE wakeup signaling. UEs 110 capable or configured for inter-UE communication may be capable of sending and receiving wakeup signals to enable and/or facilitate inter-UE communications, including inter-UE communications described herein. In some implementations, an inter-UE wakeup signal may comprise a signal of a preconfigured length. The length may be negotiated in advance (e.g., between UEs 110 engaging in inter-UE coordination), based on a size of an inter-UE group, and/or based on a distance between members of an inter-UE group. In some implementations, a wakeup signal may be a time slot and/or frequency location corresponding to a first slot of the discontinuous reception mode (DRX) cycle of a UE 110. In some implementations, UEs 110 may derive a wakeup signal sequence, timing, and frequency resources randomly or based on group ID or negotiated link ID (e.g., for unicast messaging).

In some implementations, a gap symbol of slots may be used for a wakeup signal. The gap symbol may include a last symbol of each slot a symbol corresponding to a wakeup signal may include a last symbol of each slot (since UEs 110 participating in DRX may not be monitoring previous symbols and therefore are less constrained to monitor a last symbol of each slot for a wakeup signal). Additionally, or alternatively, a wakeup signal may correspond to one or more gap symbol in slots where a PSFCH is configured (e.g., a symbol in one or more additional gap symbols) or to remaining resources of a symbol of a PSFCH.

Figure 7:
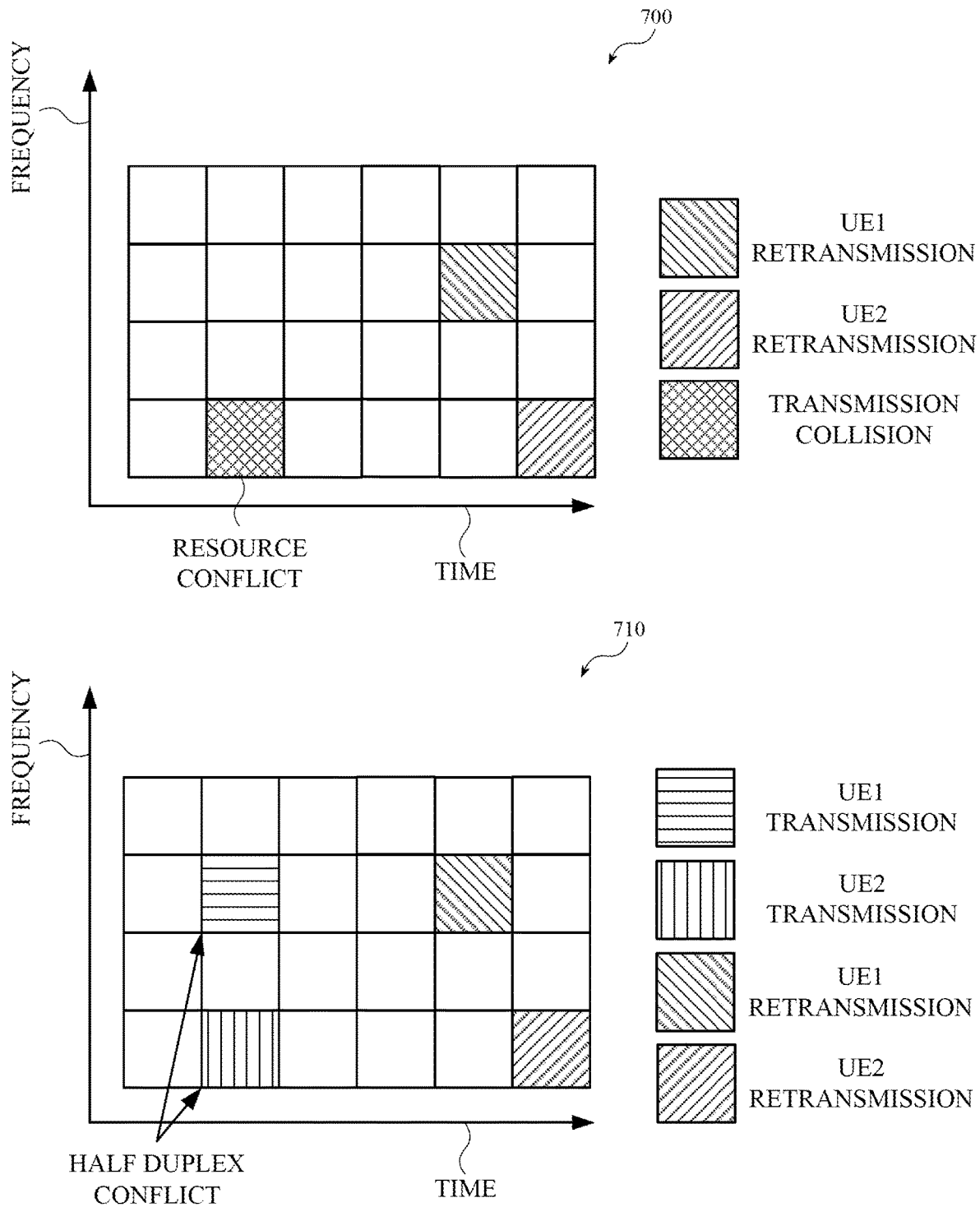
FIG. 7 is a diagram of examples of resource conflicts and retransmissions involving a first UE and a second UE.

FIG. 7 is a diagram of examples 700 and 710 of resource conflicts and retransmissions involving a second UE 110 and a third UE 110. FIG. 7 may correspond to a Type C (or Type 3) inter-UE coordination scenario. As shown, example 700 may include a scenario in which a resource conflict involves the second UE 110 and the third UE 110 using the same timing and frequency resources, and example 710 may include a scenario in which a resource conflict involves the second UE 110 and the third UE 110 using the same timing but different frequency resources (e.g., a half-duplex conflict). In each example 700 and 710, upon discovering the signal collision, UEs 110 may perform inter-UE coordination to determine suitable resources for each UE 110 to retransmit the conflicted or interrupted signal.

In some implementations, whether the first UE 110 implements Type C inter-UE coordination, which may include determining and providing the second UE 110 with an indication of a signal collision and Type C resource set for retransmission, may be based on one or more factors or conditions. For example, a Type C resource set may only be applicable to collisions involving broadcasts and/or groupcasts, which may correspond to, for example, reception of a groupcast HARQ feedback Option 1 (negative acknowledgement (NACK) only).

In some implementations, this may involve one or more types of SCI formats or indicators. For example, SCI format 2-A information may include a cast type indicator of a particular value (e.g., 00 or 01). Additionally, or alternatively, a HARQ feedback enabled/disabled value may be enabled for "cast type indicator"=01 (groupcast HARQ feedback Option 1 only). In another example, SCI format 2-B: "HARQ feedback enabled/disabled" may be set to "enabled". Additionally, or alternatively, a Type C resource set may be used (or sent) if a corresponding data priority is above certain threshold. In such scenarios, UE 110 may make this determination based on a data priority threshold and a highest priority level among the data involved in the collision. In some implementations, a Type C resource set may be used (or sent) if a measured congestion level (and/or measured constant bit rate (CBR)) is below a CBR threshold. In some implementations, a Type C resource set may be used (or sent) if the collision and/or retransmission, is within a DRX off duration of the receiving UE 110 (e.g., the second UE 110).

In some implementations, Type C inter-UE coordination may not be used or implemented in other situations or conditions. For example, a Type C resource set may not be used in response to a unicast or groupcast HARQ feedback option 2 (ACK/NACK). In such scenarios, each receiving UE 110 (e.g., the first UE 110) may instead send an ACK/NACK such that an additional post-collision indication is not helpful. Type C resource set may not be used for broadcast or groupcast HARQ with HARQ feedback disabled. In such scenarios, an additional indication (e.g., of a signal collision and retransmission resources) may not be used to additionally indicate a post-collision since the disabled HARQ feedback may indicate reliability is not a significant consideration. Additionally, or alternatively, Type C resource set may not be used (or sent) if there are more reserved resources for the same transport block (TB) retransmission.

In some implementations, a Type C resource set may not be used (or sent) when a NACK is to be transmitted for groupcast HARQ feedback Option 1. The transmission of the NACK may autonomously indicate the retransmission is warranted. In some implementations, a Type C resource set may not be used (or sent) when a distance between the first UE 110 and the second UE 110 is greater than a pre-designated distance threshold or a communication rage requirement. In some implementations, this may be determined and evaluated in scenarios where the receiving UE 110 (e.g., the first UE 110) sends SCI format 2-B information with a valid communication range requirement and zone ID. In some implementations, a Type C resource set may not be used (or sent) when a transmitting UE 110 (e.g., the first UE 110) does not support a large number of simultaneous, multiple PSFCH transmission and/or the Type C resource set indication is to be sent in a slot of the PSFCH. In some implementations, a Type C resource set may be used (or sent) when a transmitting UE 110 (e.g., the second UE 110) is a Type B or Type D device. In such implementations, the transmitting UE 110 (e.g., the second UE 110) may indicate whether the transmitting UE 110 is a Type B or Type D device in a resource reservation signal and/or SCI. A device type (e.g., a Type A device, Type B device, etc.) may be consistent with device types described and defined within the 3GPP communication standards.

Figure 8:
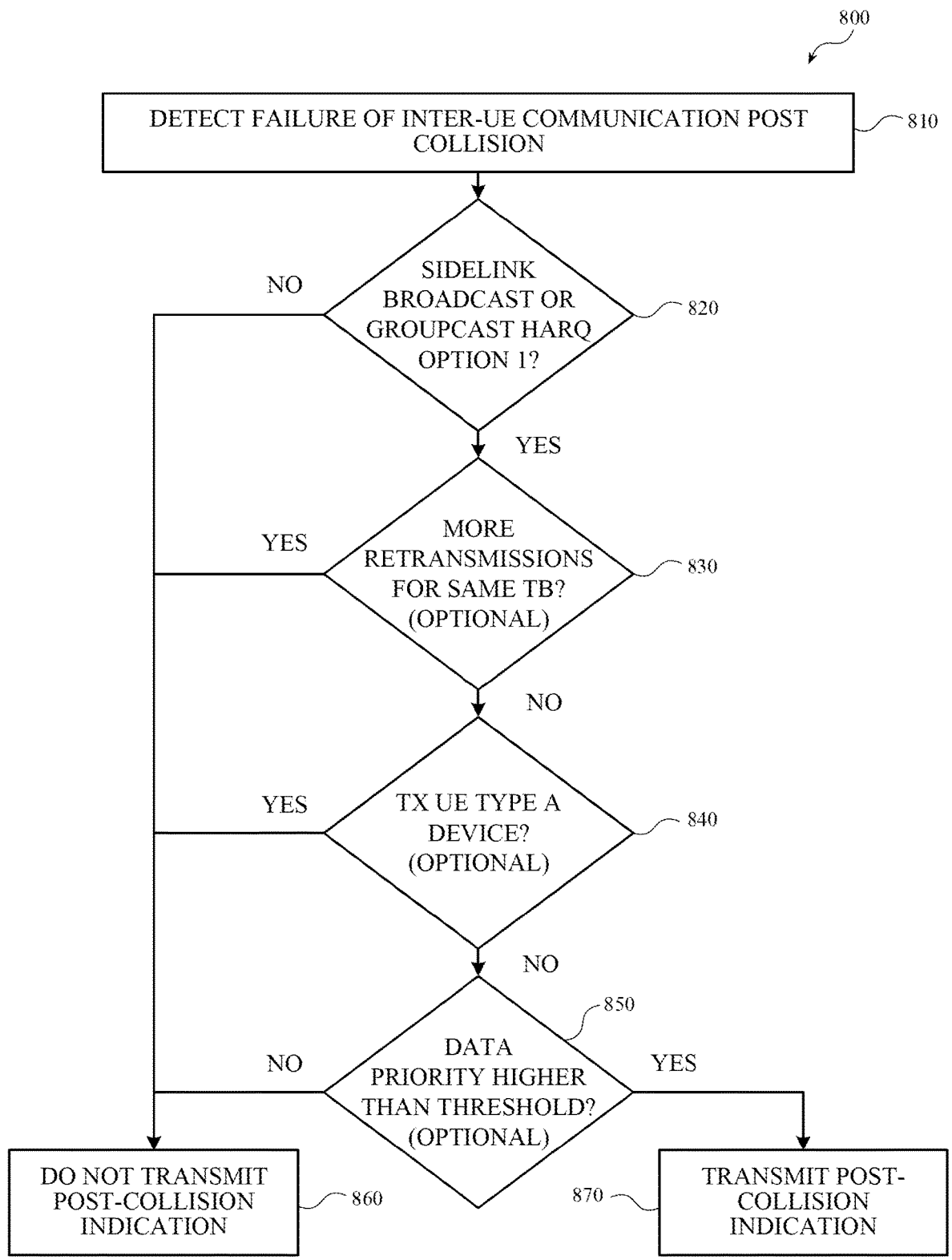
FIG. 8 is a diagram of an example of a process for determining whether to send a Type C resource set in response to an inter-UE signaling collision.

FIG. 8 is a diagram of an example of a process 800 for determining whether to send a Type C resource set in response to an inter-UE signaling collision. Process 800 may be implemented by UE 110 (e.g., a first or receiving UE 110). Generally, process 800 may correspond to a scenario in which UE 110 detects an inter-UE communication collision, determines whether inter-UE coordination and/or a Type C resource set applies, and if so, provides an indication of the collision and Type C resource set to the transmitting UE 110. Process 800 includes one or more examples of the Type C inter-UE coordination factors or conditions described above, although in other examples of process 800, any variety or combination of the factors or conditions described above (along with corresponding operations) may be included in process 800.

Additionally, while process 800 may be implemented by UE 110, in some implementations, some or all of process 800 may be performed by one or more other systems or devices, including one or more of the devices of FIG. 1.

Additionally, process 800 may include one or more fewer, additional, differently ordered and/or arranged operations than those shown in FIG. 8. In some implementations, some or all of the operations of process 800 may be performed independently, successively, simultaneously, etc., of one or more of the other operations of process 800. As such, the techniques described herein are not limited to a number, sequence, arrangement, timing, etc., of the operations or process depicted in FIG. 8. Additionally, while process 800 may be primarily described from the perspective a particular device (e.g., UE 110), the techniques described herein also include corresponding operations performed by a corresponding device (e.g., another UE 110).

As shown, process 800 may include detecting a failure of an inter-UE communication post collision (block 810). For example, a first UE 110 may detect a failure to receive an inter-UE message or signal from a second UE 110. In some implementations, UE 110 may detect the failure by identifying a conflict in resources (e.g., timing and/or frequencies) allocated to the second UE 110 for inter-UE communications. In some implementations, the first UE 110 may detect the failure post collision, which may include detecting the failure after the collision occurred.

Process 800 may include determining whether the inter-UE communication failure corresponds to a SL broadcast or groupcast feedback HARQ (e.g., Option 1) (block 820). For example, the first UE 110 may determine whether the collision was part of a broadcast or groupcast from the second UE 110 and/or whether HARQ feedback Option 1 (e.g., responding with a NACK only) applies to the signal failure. When these conditions do not apply (block 820—No), process 800 may include refraining from transmitting a post-collision indication (block 860). When one of these conditions do apply (block 820—Yes), process 800 may include determining whether more retransmissions are to occur for the same TB as the failed inter-UE communication (block 830). For example, the first UE 110 may determine whether there are more resources allocated (e.g., already allocated) for retransmission of the TB of the failed transmission.

When more retransmissions are to occur (block 830—Yes), process 800 may include refraining from transmitting a post-collision indication (block 860). When more retransmissions are not to occur (block 830—No), process 800 may include determining whether the transmitting UE 110 is a Type A device (block 840). For example, the first UE 110 may determine a device type of the second UE 110, and based on the device type, determine how to proceed regarding the inter-UE communication failure. When the transmitting UE 110 is a Type A device (block 840—Yes), process 800 may include refraining from transmitting a post-collision indication (block 860).

When the transmitting UE 110 is not a Type A device (block 840—No), process 800 may include determining whether a data priority of the inter-UE communication failure is greater than a data priority threshold (block 850). For example, the first UE 110 may determine a data priority level corresponding to the failed signal from the second UE 110. Additionally, or alternatively, the first UE 110 may compare the data priority level to a pre-determined data priority threshold (which may be stored and/or determined by the first UE 110) for determining how to handle inter-UE communication failures. When the data priority of the inter-UE communication failure is not greater than the data priority threshold (block 850—No), process 800 may include refraining from transmitting a post-collision indication (block 860). When the data priority of the inter-UE communication failure is greater than the data priority threshold (block 850—Yes), process 800 may include transmitting a post-collision indication (block 870). For example, the first UE 110 may transmit a signal to the second UE 110, indicating that the inter-UE communication was not successfully received and/or indicating a resource set (e.g., a Type C resource set) for retransmitting the failed inter-UE communication.

Figure 9:
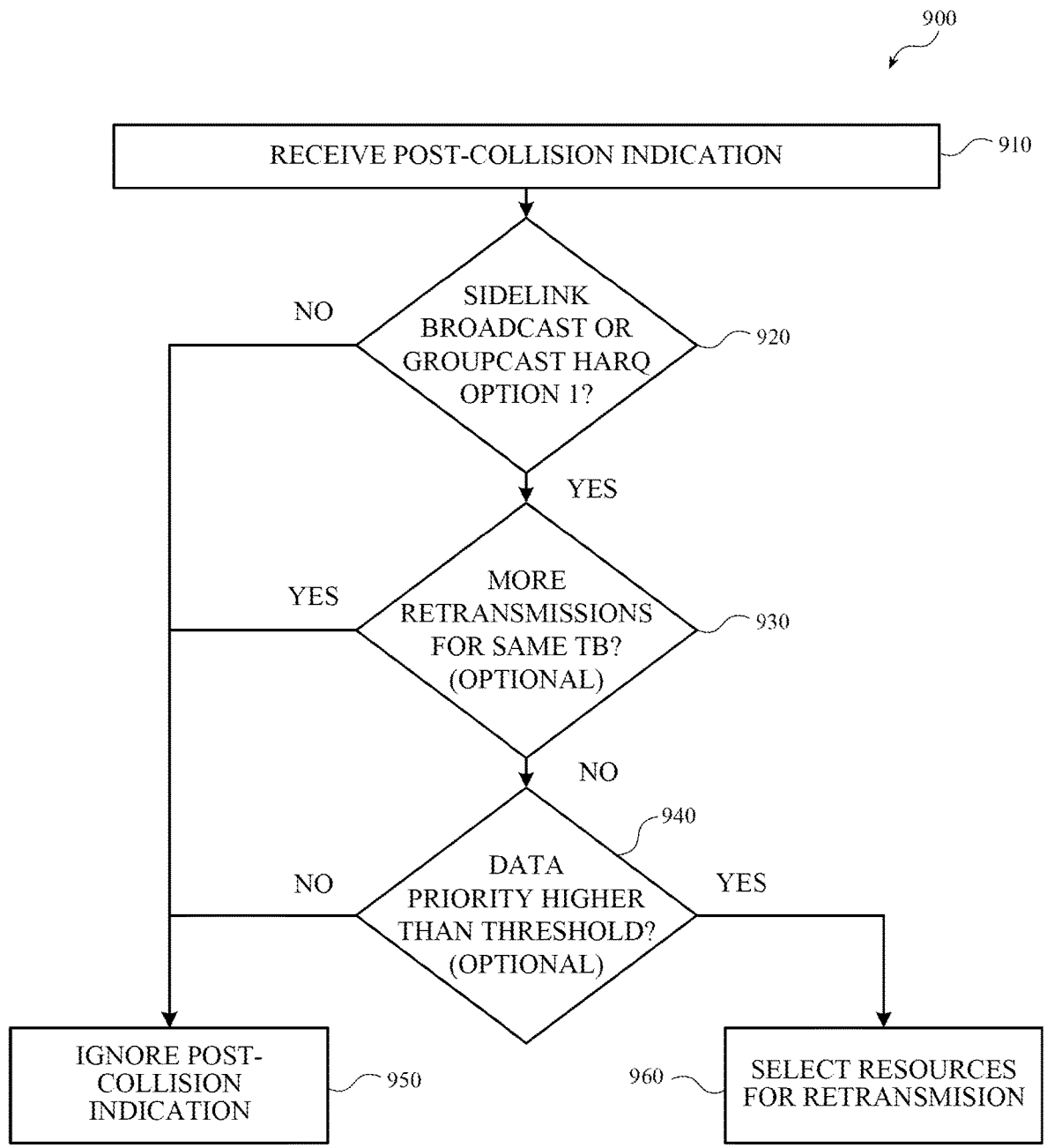
FIG. 9 is a diagram of an example of a process for determining whether to retransmit an inter-UE communication based on a post-collision indication of a communication failure.

FIG. 9 is a diagram of an example of a process 900 for determining whether to retransmit an inter-UE communication based on a post-collision indication of a communication failure. Process 900 may be implemented by UE 110 (e.g., a second or transmitting UE 110). Process 900 includes one or more examples of the Type C inter-UE coordination factors or conditions described above, although in other examples of process 900, any variety or combination of the factors or conditions described above (along with corresponding operations) may be included in process 900.

Additionally, while process 900 may be implemented by UE 110, in some implementations, some or all of process 900 may be performed by one or more other systems or devices, including one or more of the devices of FIG. 1. Additionally, process 900 may include one or more fewer, additional, differently ordered and/or arranged operations than those shown in FIG. 9. In some implementations, some or all of the operations of process 900 may be performed independently, successively, simultaneously, etc., of one or more of the other operations of process 900. As such, the techniques described herein are not limited to a number, sequence, arrangement, timing, etc., of the operations or process depicted in FIG. 9. Additionally, while process 900 may be primarily described from the perspective a particular device (e.g., UE 110), the techniques described herein also include corresponding operations performed by a corresponding device (e.g., another UE 110).

As shown, process 900 may include receiving a post-collision indication (block 910). For example, UE 110 (e.g., the second UE 110) may receive a message or signal from another UE 110 (e.g., the first UE 110) indicating that the first UE 110 failed to receive an inter-UE transmission from the second UE 110. The post collision indication may also include a resource set (e.g., a Type C resource set) for retransmitting the failed inter-UE communication.

Process 900 may include determining whether the inter-UE communication failure corresponds to a SL broadcast or groupcast feedback HARQ (e.g., Option 1) (block 920). For example, the second UE 110 may determine whether the failed signal was part of a broadcast or groupcast from the second UE 110 and/or whether HARQ feedback Option 1 (e.g., responding with a NACK) applies to the signal failure. When neither of these conditions apply (block 920—No), process 900 may include ignoring the post-collision indication (block 950). For example, the second UE 110 may ignore the message from the first UE 110 instead of, for example, selecting resources for retransmitting the inter-UE communication. When one of these conditions do apply (block 920—Yes), process 900 may include determining whether more retransmissions are to occur for the same TB as the failed inter-UE communication (block 930). For example, the second UE 110 may determine whether there are more resources allocated (e.g., already allocated) for retransmission of the TB of the failed transmission.

When more retransmissions are to occur (block 930—Yes), process 900 may include ignoring the post-collision indication (block 950). When more retransmissions are not to occur (block 930—No), process 900 may determine whether a data priority of the inter-UE communication failure is greater than a data priority threshold (block 940). For example, the second UE 110 may determine a data priority level corresponding to the failed inter-UE communication and may compare the data priority level to a pre-determined data priority threshold (which may be stored and/or determined by the second UE 110) for determining how to handle inter-UE communication failures. When the data priority of the inter-UE communication failure is not greater than the data priority threshold (block 940—No), process 900 may include ignoring the post-collision indication (block 950). When the data priority of the inter-UE communication failure is greater than the data priority threshold (block 950—Yes), process 900 may include selecting resources for retransmission (block 960). For example, UE 110 receiving the post-collision indication from the first UE 110 may include a set of resources (e.g., a Type C resource set) for retransmitting the failed communication, and the second UE 110 may proceed with retransmitting the failed communication in accordance with the selected resources.

Figure 10:
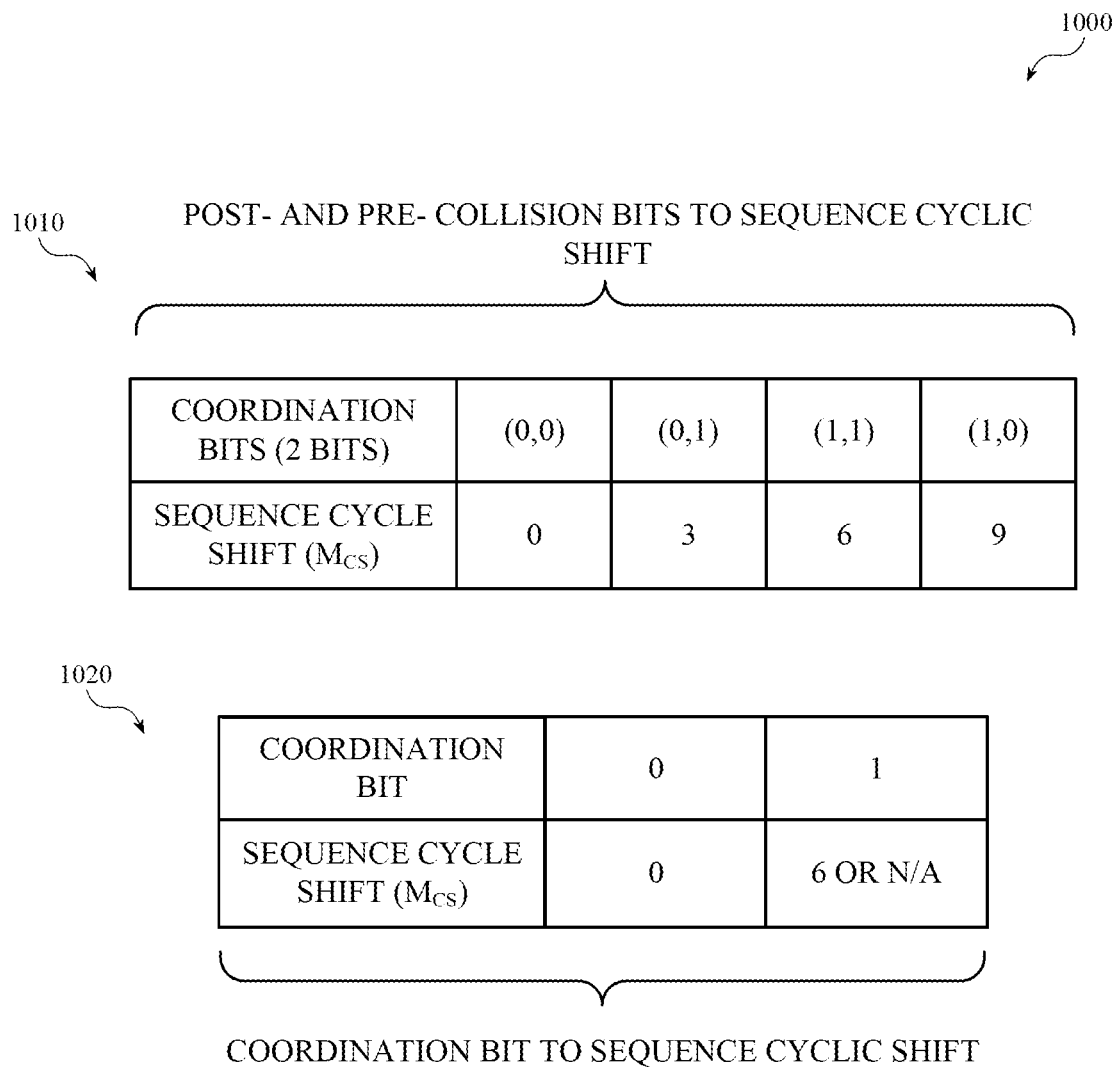
FIG. 10 is a diagram of examples for encoding resource sets.

FIG. 10 is a diagram 1000 of examples 1010 and 1020 for encoding resource sets. As shown by example 1010, in some implementations, a 2-bit coordination scheme may be implemented for joint encoding Type B and Type C resource sets. The scheme may map collision indications to cyclic shift of a sequence. In some implementations, example 1010 may be implemented in scenarios involving groupcast HARQ feedback Option 1. For example, a physical sidelink feedback coordination channel (PSFCCH) may include up to 2 bits of information for indicating resource collisions. One bit may represent whether a collision indication corresponds to a pre-collision indication (e.g., to indicate a future resource collision) or a post-collision indication (e.g., to indicate a past resource collision). For example, (0, 0) may indicate no past and no future resource collision; (0, 1) may indicate no past resource collision but a future resource collision; (1, 0) may indicate a past resource collision, but no future resource collision; and (1, 1) may indicate a past resource collision and a future resource collision. Additionally, as shown in example 1010, bit sequences may be mapped, associated with, or otherwise correspond to a sequence cycle shift ($M_{CS}$) of 0, 3, 6, and 9, for example.

As shown by example 1020, in some implementations, a 1-bit coordination scheme may be implemented for encoding Type C resource sets. In some implementations, separate PSFCCH resources may be used for Type C resource sets than from PSFCCH resources for type B resource sets. Additionally, or alternatively, a resource pool may have a bitmap to indicate the dedicated PSFCCH resources for Type C resource sets. In example 1020, a PSFCCH may include 1 bit information to indicate a past resource collision, and the 1 bit may be mapped to a sequence cycle shift ($M_{CS}$) of 0 or 6 (or N/A). $M_{CS}$="N/A" may indicate "NACK-only" or "collision-only" PSFCCH.

PSFCCH resources, relative to PSSCH resources, may be configured and/or determined by UE 110, in one or more ways. For example, a minimum time gap between a PSFCCH and PSSCH may be configured by a designated CE, such as a sl-MinTimeGapPSFCCH CE. In some implementations, the minimum time gap between the PSFCCH and PSSCH may be the same or different than a minimum time gap between a PSFCH and PSSCH, which may be configured by a designated CE, such as a sl-MinTimeGapPSFCH CE. Different minimum time gap values of sl-MinTimeGapPSFCCH and sl-MinTimeGapPSFCH may enable a receiving UE 110 with limited PSFCH transmission capability to use the PSFCH and PSFCCH at different slots.

Regarding frequency/code domain resources, a total number of candidate PSFCCH frequency/code domain resources for a PSCCH/PSSCH may be given by, or correspond to, a number of cyclic shift pairs for a resource pool, times a number of PRBs of a corresponding PSCCH/PSSCH. In some implementations, an actual frequency/code domain resource may be determined by a Layer 1 (L1) source ID and/or L1 destination ID of an associated PSCCH/PSSCH. In such implementations, for a coordination UE (which is not a receiving UE of a sidelink groupcast HARQ Option 1) L1 destination ID may be equal to a non-zero value (e.g., equal to 1)

Figure 11:
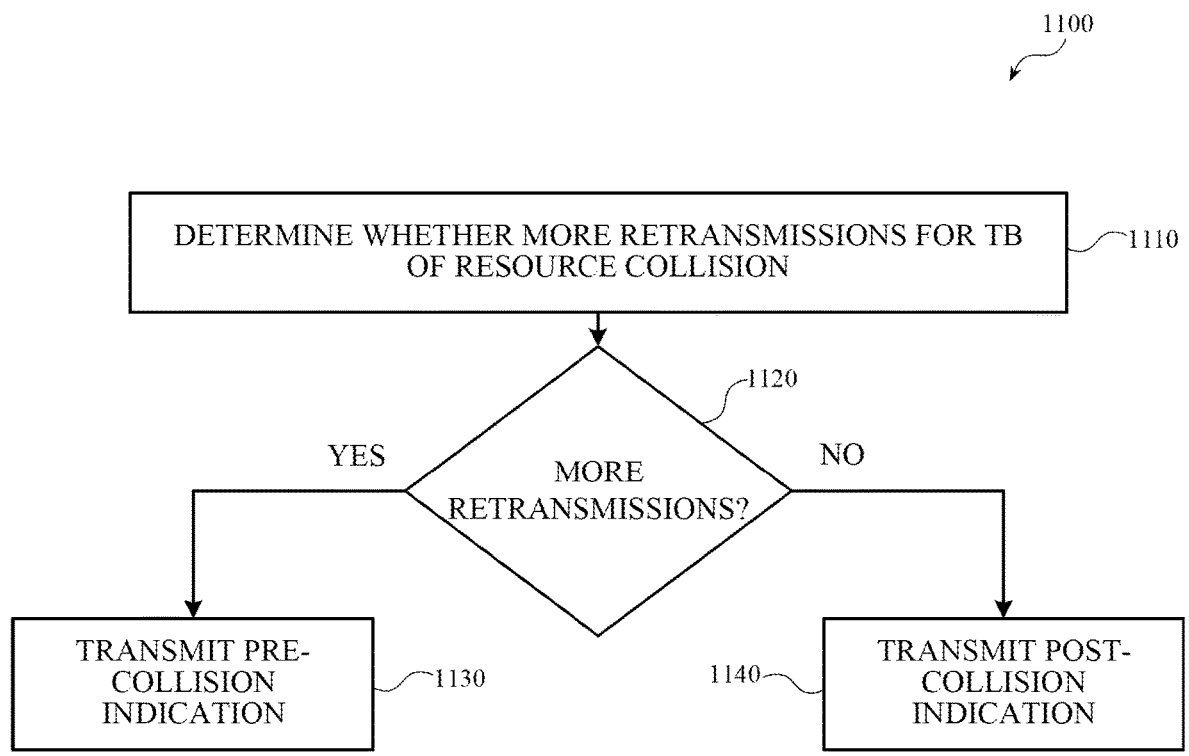
FIG. 11 is a diagram of an example of a process for switching between pre-collision indications and post-collision indication.

FIG. 11 is a diagram of an example of a process 1100 for dynamically switching between pre-collision indications and post-collision indication. Process 1100 may be implemented by UE 110 (e.g., a first or receiving UE 110). In some implementations, some or all of process 1100 may be performed by one or more other systems or devices, including one or more of the devices of FIG. 1. Additionally, process 1100 may include one or more fewer, additional, differently ordered and/or arranged operations than those shown in FIG. 11. In some implementations, some or all of the operations of process 1100 may be performed independently, successively, simultaneously, etc., of one or more of the other operations of process 1100. As such, the techniques described herein are not limited to a number, sequence, arrangement, timing, etc., of the operations or process depicted in FIG. 11. Additionally, while process 1100 may be primarily described from the perspective a particular device (e.g., UE 110), the techniques described herein also include corresponding operations performed by a corresponding device (e.g., another UE 110).

As shown, process 1100 may include determining whether there are additional retransmissions for a TB (block 1110). For example, when a first UE 110 detects a resource collision and is to indicate the resource collision to a second UE 110, the first UE 110 may determine whether a TB associated with the collision is scheduled for any additional retransmissions (e.g., of the signal, message, or information involved in the resource collision). When more retransmissions are scheduled (block 1120—Yes), process 1100 may include transmitting a pre-collision indication (block 1130). For example, when the TB associated with the collision is already scheduled for retransmissions, the first UE 110 may transmit a pre-collision indication, regarding the conflicted resources, to indicate a future resource collision to the second UE 110. For instance, when a PSCCH/PSSCH is not the last transmission of the TB, then the first UE 110 may select and transmit a Type B resource set to indicate a future resource collision. In such a scenario, a time resource indicator value (TRIV) of SCI may be larger than 0. In some implementations, for a Type B resource set (including pre-collision indications and/or non-preferred resources for the second UE 110 to use for transmission), the first UE 110 may indicate an unavailable resource slot due to the first UE 110 (e.g., receiving UE 110) or another UE 110 DRX off duration.

When no more retransmissions are scheduled (block 1120—No), process 1100 may include transmitting a post-collision indication (block 1140). For example, when the TB associated with the collision is not scheduled for any retransmissions, the first UE 110 may transmit a post-collision indication, regarding the conflicted resources, to the second UE 110. For instance, when a PSCCH/PSSCH is the last transmission of a TB, then the first UE 110 may select and transmit a Type C resource set is indicate the past resource collision. In such a scenario, a TRIV of SCI may be 0.

In some implementations, the first UE 110 may, also, or alternatively, transmit a post-collision indication when any previous transmissions, of one or more prior transmissions of the TB, involved a resource collision. Otherwise, the first UE 110 may provide no resource collision indication or provide an indication of no prior resource collisions. In some implementations, the first UE 110 may, also, or alternatively, transmit a post-collision indication when the most recent transmission, of one or more prior transmissions of the TB, involved a resource collision. Otherwise, the first UE 110 may provide no resource collision indication or provide an indication of no prior resource collisions. In some implementations, the first UE 110 may, also, or alternatively, transmit a post-collision indication when all prior transmissions of the TB were involved a resource collision. Otherwise, the first UE 110 may provide no resource collision indication or provide an indication of no prior resource collisions.

Figure 12:
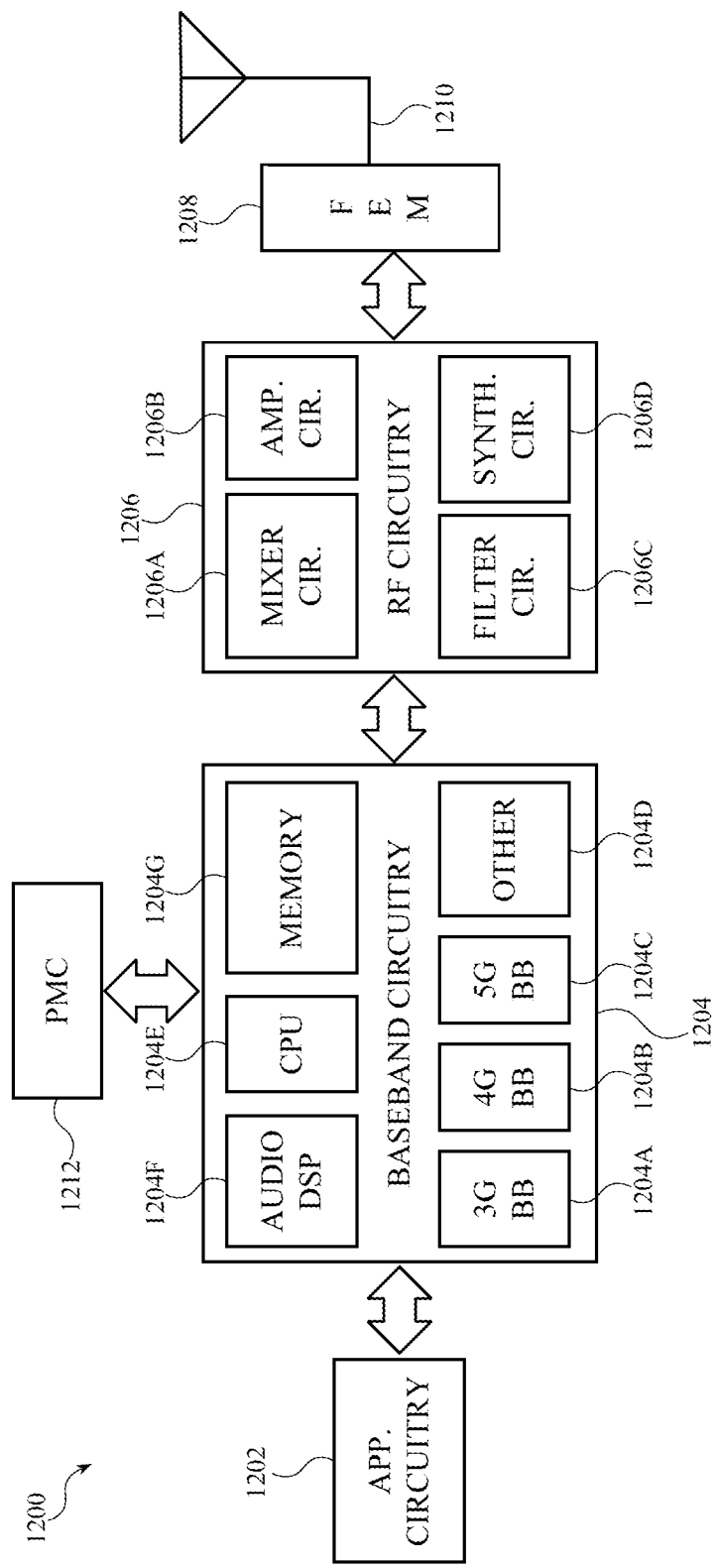
FIG. 12 is a diagram of an example of components of a device according to one or more implementations described herein.

FIG. 12 is a diagram of an example of components of a device according to one or more implementations described herein. In some implementations, the device 1200 can include application circuitry 1202, baseband circuitry 1204, RF circuitry 1206, front-end module (FEM) circuitry 1208, one or more antennas 1210, and power management circuitry (PMC) 1212 coupled together at least as shown. The components of the illustrated device 1200 can be included in a UE or a RAN node. In some implementations, the device 1200 can include fewer elements (e.g., a RAN node may not utilize application circuitry 1202, and instead include a processor/controller to process IP data received from a CN such as 5GC 130 or an Evolved Packet Core (EPC)). In some implementations, the device 1200 can include additional elements such as, for example, memory/storage, display, camera, sensor (including one or more temperature sensors, such as a single temperature sensor, a plurality of temperature sensors at different locations in device 1200, etc.), or input/output (I/O) interface. In other implementations, the components described below can be included in more than one device (e.g., said circuitries can be separately included in more than one device for Cloud-RAN (C-RAN) implementations).

The application circuitry 1202 can include one or more application processors. For example, the application circuitry 1202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1200. In some implementations, processors of application circuitry 1202 can process IP data packets received from an EPC.

The baseband circuitry 1204 can include circuitry such as, but not limited to, one or more single-core or multi-core processors. The baseband circuitry 1204 can include one or more baseband processors or control logic to process baseband signals received from a receive signal path of the RF circuitry 1206 and to generate baseband signals for a transmit signal path of the RF circuitry 1206. Baseband circuitry 1204 can interface with the application circuitry 1202 for generation and processing of the baseband signals and for controlling operations of the RF circuitry 1206. For example, in some implementations, the baseband circuitry 1204 can include a 3G baseband processor 1204A, a 4G baseband processor 1204B, a 5G baseband processor 1204C, or other baseband processor(s) 1204D for other existing generations, generations in development or to be developed in the future (e.g., 2G, 6G, etc.). The baseband circuitry 1204 (e.g., one or more of baseband processors 1204A-D) can handle various radio control functions that enable communication with one or more radio networks via the RF circuitry 1206. In other implementations, some or all of the functionality of baseband processors 1204A-D can be included in modules stored in the memory 1204G and executed via a Central Processing Unit (CPU) 1204E. The radio control functions can include, but are not limited to, signal modulation/demodulation, encoding/decoding, radio frequency shifting, etc. In some implementations, modulation/demodulation circuitry of the baseband circuitry 1204 can include Fast-Fourier Transform (FFT), precoding, or constellation mapping/de-mapping functionality. In some implementations, encoding/decoding circuitry of the baseband circuitry 1204 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1204 can include one or more audio digital signal processor(s) (DSP) 1204F. The audio DSPs 1204F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1204 and the application circuitry 1202 can be implemented together such as, for example, on a system on a chip (SOC).

In some implementations, the baseband circuitry 1204 can provide for communication compatible with one or more radio technologies. For example, in some implementations, the baseband circuitry 1204 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various implementations, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some implementations, the receive signal path of the RF circuitry 1206 can include mixer circuitry 1206A, amplifier circuitry 1206B and filter circuitry 1206C. In some implementations, the transmit signal path of the RF circuitry 1206 can include filter circuitry 1206C and mixer circuitry 1206A. RF circuitry 1206 can also include synthesizer circuitry 1206D for synthesizing a frequency for use by the mixer circuitry 1206A of the receive signal path and the transmit signal path. In some implementations, the mixer circuitry 1206A of the receive signal path can be configured to down-convert RF signals received from the FEM circuitry 1208 based on the synthesized frequency provided by synthesizer circuitry 1206D. The amplifier circuitry 1206B can be configured to amplify the down-converted signals and the filter circuitry 1206C can be a low-pass filter (LPF) or band-pass filter (BPF) configured to remove unwanted signals from the down-converted signals to generate output baseband signals. Output baseband signals can be provided to the baseband circuitry 1204 for further processing. In some implementations, the output baseband signals can be zero-frequency baseband signals, although this is not a requirement. In some implementations, mixer circuitry 1206A of the receive signal path can comprise passive mixers, although the scope of the implementations is not limited in this respect.

In some implementations, the mixer circuitry 1206A of the transmit signal path can be configured to up-convert input baseband signals based on the synthesized frequency provided by the synthesizer circuitry 1206D to generate RF output signals for the FEM circuitry 1208. The baseband signals can be provided by the baseband circuitry 1204 and can be filtered by filter circuitry 1206C.

In some implementations, the mixer circuitry 1206A of the receive signal path and the mixer circuitry 1206A of the transmit signal path can include two or more mixers and can be arranged for quadrature down conversion and up conversion, respectively. In some implementations, the mixer circuitry 1206A of the receive signal path and the mixer circuitry 1206A of the transmit signal path can include two or more mixers and can be arranged for image rejection (e.g., Hartley image rejection). In some implementations, the mixer circuitry 1206A of the receive signal path and the mixer circuitry 1206A can be arranged for direct down conversion and direct up conversion, respectively. In some implementations, the mixer circuitry 1206A of the receive signal path and the mixer circuitry 1206A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode implementations, a separate radio IC circuitry can be provided for processing signals for each spectrum, although the scope of the implementations is not limited in this respect.

In some implementations, the synthesizer circuitry 1206D can be a fractional-N synthesizer or a fractional N/N+1 synthesizer, although the scope of the implementations is not limited in this respect as other types of frequency synthesizers can be suitable. For example, synthesizer circuitry 1206D can be a delta-sigma synthesizer, a frequency multiplier, or a synthesizer comprising a phase-locked loop with a frequency divider.

The synthesizer circuitry 1206D can be configured to synthesize an output frequency for use by the mixer circuitry 1206A of the RF circuitry 1206 based on a frequency input and a divider control input. In some implementations, the synthesizer circuitry 1206D can be a fractional N/N+1 synthesizer.

In some implementations, frequency input can be provided by a voltage controlled oscillator (VCO), although that is not a requirement. Divider control input can be provided by either the baseband circuitry 1204 or the applications circuitry 1202 depending on the desired output frequency. In some implementations, a divider control input (e.g., N) can be determined from a look-up table based on a channel indicated by the applications circuitry 1202.

Synthesizer circuitry 1206D of the RF circuitry 1206 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1206D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1206 can include an IQ/polar converter.

FEM circuitry 1208 can include a receive signal path which can include circuitry configured to operate on RF signals received from one or more antennas 1210, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210. In various implementations, the amplification through the transmit or receive signal paths can be done solely in the RF circuitry 1206, solely in the FEM circuitry 1208, or in both the RF circuitry 1206 and the FEM circuitry 1208.

In some implementations, the FEM circuitry 1208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210).

In some implementations, the PMC 1212 can manage power provided to the baseband circuitry 1204. In particular, the PMC 1212 can control power-source selection, voltage scaling, battery charging, or DC-to-DC conversion. The PMC 1212 can often be included when the device 1200 is capable of being powered by a battery, for example, when the device is included in a UE. The PMC 1212 can increase the power conversion efficiency while providing desirable implementation size and heat dissipation characteristics.

While FIG. 12 shows the PMC 1212 coupled only with the baseband circuitry 1204. However, in other implementations, the PMC 1212 may be additionally or alternatively coupled with, and perform similar power management operations for, other components such as, but not limited to, application circuitry 1202, RF circuitry 1206, or FEM circuitry 1208.

In some implementations, the PMC 1212 can control, or otherwise be part of, various power saving mechanisms of the device 1200. For example, if the device 1200 is in an RRC_Connected state, where it is still connected to the RAN node as it expects to receive traffic shortly, then it can enter a state known as Discontinuous Reception Mode (DRX) after a period of inactivity. During this state, the device 1200 can power down for brief intervals of time and thus save power.

If there is no data traffic activity for an extended period of time, then the device 1200 can transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1202 and processors of the baseband circuitry 1204 can be used to execute elements of one or more instances of a protocol stack. For example, processors of the baseband circuitry 1204, alone or in combination, can be used execute Layer 3, Layer 2, or Layer 1 functionality, while processors of the baseband circuitry 1204 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 13:
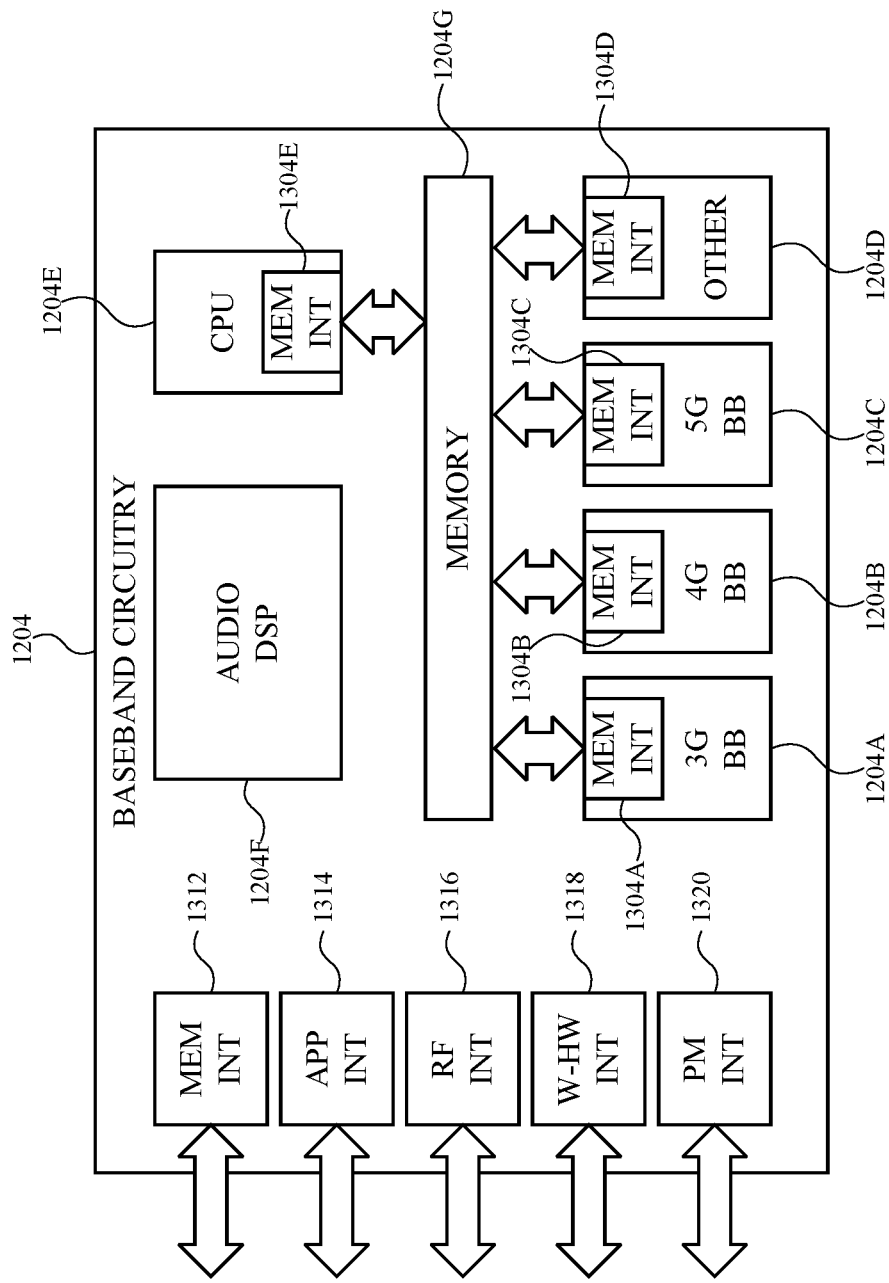
FIG. 13 is a diagram of example interfaces of baseband circuitry according to one or more implementations described herein.

FIG. 13 is a diagram of example interfaces of baseband circuitry according to one or more implementations described herein. As discussed above, the baseband circuitry 1204 of FIG. 12 can comprise processors 1204A-1204E and a memory 1204G utilized by said processors. Each of the processors 1204A-1204E can include a memory interface, 1304A-1304E, respectively, to send/receive data to/from the memory 1204G.

The baseband circuitry 1204 can further include one or more interfaces to communicatively couple to other circuitries/devices, such as a memory interface 1312 (e.g., an interface to send/receive data to/from memory external to the baseband circuitry 1204), an application circuitry inter- face 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, a baseband processor of a user equipment (UE) may comprise: one or more processors configured to: obtain a reference signal received power (RSRP) threshold for coordinating inter-UE communication between the UE and another UE, the RSRP threshold being based on a data priority of the other UE; determine, based on the RSRP, a set of candidate resources for inter-UE communication between the UE and the other UE; and report the set of candidate resources to the other UE. In example 2, the RSRP threshold is also based on a distance between the UE and the other UE.

In example 3, the set of candidate resources is also based on an RSRP of candidate resources already reserved for at least one additional UE. In example 4, the one or more processors are to: receive a data priority corresponding to a communication from the other UE to the UE, wherein the set of candidate resources are determined based on a combination of the RSRP and the data priority. In example 5, the set of candidate resources is also based on a resource selection value ($C_{resel}$) comprising a number of periods for a resource reservation, a data periodicity, and a number of resources.

In example 6, the one or more processors are to: periodically broadcast or groupcast resources already reserved in UE coordination. In example 7, the one or more processors are to: broadcast or groupcast a sensing capability to other UEs, the sensing capability indicating an ability of the UE to engage in inter-UE coordination. In example 8, the one or more processors are to: receive, from the other UE, a request for inter-UE coordination; and respond to the request by reporting the set of candidate resources to the other UE. In example 9, the request for inter-UE coordination is dependent on a distance between the UE and the other UE. In example 10, wherein the reporting the set of candidate resources to the other UE is dependent on a distance between the UE and the other UE.

In example 11, the set of candidate resources, communicated to the other UE, comprise at least one of: a set of preferred resources, of the UE, for unicast based inter-UE coordination; a set of non-preferred resources, of the UE, for groupcast or broadcast inter-UE coordination; or a set of conflicted resources, determined by the UE, for unicast based inter-UE coordination or groupcast inter-UE coordination. In example 12, the one or more processors are to: determine the set of candidate resources based on at least one of: an availability of resources for inter-UE communication; a level of congestion measured by the UE; a distance between the UE and the other UE; and a payload size associated with inter-UE coordination between the UE and the other UE. In example 13, the other UE is to select resources, from the set of candidate resources for inter-UE communication, based on at least one of: a quality of service (QoS) for inter-UE communication; a packet delay budget for inter-UE communication; and a cast-type for inter-UE communication.

In example 14, a user equipment (UE) may comprise one or more processors configured to: detect a signal collision involving an inter-UE communication between the UE and another UE; determine, based on one or more conditions associated with the inter-UE communications, whether to transmit a post-collision indication to the other UE; and transmit the post-collision indication to the other UE when the one or more conditions is satisfied, the post-collision indication comprising retransmission resources for information involved in the signal collision. In example 15, the one or more conditions comprises: the signal collision involving a sidelink (SL) broadcast or groupcast hybrid automatic repeat request (HARQ) with negative acknowledgement (NACK).

In example 16, wherein the one or more conditions comprises: whether a retransmission of the inter-UE communication is already scheduled. In example 17, the one or more conditions comprises: a device type of the other UE. In example 18, the one or more conditions comprises: a determination, by the UE, of whether a data priority associated with the signal collision is greater than a data priority threshold. In example 19, post-collision indication comprises at least one of: a 2-bit indication of pre-collision indication and the post-collision indication in a physical sidelink feedback coordination channel (PSFCCH). In example 20, post-collision indication comprises at least one of: a 1-bit indication of the post-collision indication in a physical sidelink feedback coordination channel (PSFCCH)

In example 21, the one or more processors are to: determine, based on the signal collision, a type of resource set to communication to the other UE with either the pre-collision indication or the post-collision indication. In example 22, a method of a user equipment (UE), comprising: one or more processor configured to: receive a post-collision indication of a signal collision involving an inter-UE communication between the UE and another UE; determine, based on one or more conditions corresponding to the post-collision indication, whether to retransmit information associated with the post-collision indication; and retransmit information associated with the post-collision indication when the one or more conditions is satisfied. In example 23, the one or more conditions comprises: the signal collision involving a sidelink (SL) broadcast or groupcast hybrid automatic repeat request (HARQ) with negative acknowledgement (NACK).

In example 24, the one or more conditions comprises: whether a retransmission of the inter-UE communication is already scheduled. In example 25, the one or more conditions comprises: a determination, by the UE, of whether a data priority associated with the signal collision is greater than a data priority threshold. In example 25, a method may include any action or combination of actions as substantially described herein in the Detailed Description or any combination of the Figures. In example 26, an apparatus may be configured to perform any action or combination of actions as substantially described herein in the Detailed Description or any combination of the Figures. In example 27, a non-transitory computer-readable medium may store instructions that, when executed, cause the performance of any action or combination of actions as substantially described herein in the Detailed Description or any combination of the Figures.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:
radio frequency (RF) circuitry; and
one or more processors configured to, when executing instructions stored in a memory, cause the UE to:
detect a signal collision involving an inter-UE communication between the UE and another UE; and
transmit, on a physical sidelink feedback coordination channel (PSFCCH) and via the RF circuitry, a 2-bit pre-collision and post-collision indication to the other UE when one or more conditions associated with the inter-UE communication are satisfied, wherein the post-collision indication indicates retransmission resources for information involved in the signal collision.

2. The UE of claim 1, wherein the one or more conditions comprise:
the signal collision involving a sidelink (SL) broadcast or groupcast hybrid automatic repeat request (HARQ) message with a negative acknowledgement (NACK).

3. The UE of claim 1, wherein the one or more conditions comprise:
a retransmission of the inter-UE communication already being scheduled.

4. The UE of claim 1, wherein the one or more conditions are based on a device type of the other UE.

5. The UE of claim 1, wherein the one or more conditions comprise:
a data priority associated with the signal collision being greater than a data priority threshold.

6. The UE of claim 1, wherein the post-collision indication comprises:
a 1-bit indication on the PSFCCH.

7. The UE of claim 1, wherein the one or more processors further cause the UE to:
determine, based on the signal collision, a type of resource set to communicate to the other UE with either the pre-collision indication or the post-collision indication.

8. The UE of claim 1, wherein the one or more processors further cause the UE to:
transmit, via the RF circuitry, the post-collision indication to the other UE when a time gap between the signal collision and the transmission of the post-collision indication is greater than a minimum time gap.

9. The UE of claim 8, wherein the minimum time gap is equal to a minimum time gap indicated in a sl-MinTimeGapPSFCH control element (CE).

10. A method for a user equipment (UE), comprising:
receiving, on a physical sidelink feedback coordination channel (PSFCCH), a 2-bit pre-collision and post-collision indication for a signal collision involving an inter-UE communication between the UE and another UE;
determining, based on one or more conditions corresponding to the post-collision indication, whether to retransmit information associated with the post-collision indication; and
retransmitting information associated with the post-collision indication when the one or more conditions are satisfied.

11. The method of claim 10, wherein the one or more conditions comprise:
the signal collision involving a sidelink (SL) broadcast or groupcast hybrid automatic repeat request (HARQ) message with a negative acknowledgement (NACK).

12. The method of claim 10, wherein the one or more conditions comprise:
a retransmission of the inter-UE communication already being scheduled.

13. The method of claim 10, wherein the one or more conditions comprise:
a data priority associated with the signal collision being greater than a data priority threshold.

14. A baseband processor for a user equipment (UE), the baseband processor configured to, when executing instructions stored in a memory, perform operations comprising:
detecting a signal collision involving an inter-UE communication between the UE and another UE;
determining, based on one or more conditions associated with the inter-UE communication, whether to transmit a post-collision indication to the other UE; and
providing, to a radio frequency (RF) interface for transmission to the other UE on a physical sidelink feedback coordination channel (PSFCCH), a 2-bit pre-collision and post-collision indication in response to the one or more conditions being satisfied, the post-collision indication comprising retransmission resources for information involved in the signal collision.

15. The baseband processor of claim 14, wherein the one or more conditions comprise:
the signal collision involving a sidelink (SL) broadcast or groupcast hybrid automatic repeat request (HARQ) message with a negative acknowledgement (NACK).

16. The baseband processor of claim 14, wherein the one or more conditions comprise:
a retransmission of the inter-UE communication is already being scheduled.

17. The baseband processor of claim 14, wherein the one or more conditions are based on a device type of the other UE.

18. The baseband processor of claim 14, wherein the one or more conditions comprise:
a data priority associated with the signal collision being greater than a data priority threshold.

19. The baseband processor of claim 14, wherein the post-collision indication comprises a 1-bit indication on the PSFCCH.

20. The baseband processor of claim 14, wherein the operations further comprise:
determining, based on the signal collision, a type of resource set to communicate to the other UE with either the pre-collision indication or the post-collision indication.

21. The baseband processor of claim 14, wherein the operations further comprise:
providing, to the RF interface for transmission to the other UE, the post-collision indication when a time gap between the signal collision and the transmission of the post-collision indication is greater than a minimum time gap.

22. The baseband processor of claim 21, wherein the operations further comprise receiving a sl-MinTimeGapPSFCH control element (CE) to configure the minimum time gap.

23. The baseband processor of claim 22, wherein the operations further comprise:
receiving a sl-MinTimeGapPSFCCH CE to configure a minimum time gap for the PSFCCH;
wherein the minimum time gap configured by the sl-MinTimeGapPSFCH CE is for a physical sidelink feedback channel (PSFCH), and wherein the minimum time gap for the PSFCH is different than the minimum time gap for the PSFCCH.

* * * * *